US009644876B2

(12) United States Patent
Tamaki et al.

(10) Patent No.: US 9,644,876 B2
(45) Date of Patent: May 9, 2017

(54) REFRIGERATION CYCLE APPARATUS

(75) Inventors: Shogo Tamaki, Tokyo (JP); Makoto Saito, Tokyo (JP); Ryo Oya, Tokyo (JP)

(73) Assignee: MITSUBISHI ELECTRIC CORPORATION, Tokyo (JP)

( * ) Notice: Subject to any disclaimer, the term of this patent is extended or adjusted under 35 U.S.C. 154(b) by 414 days.

(21) Appl. No.: 14/381,033

(22) PCT Filed: Mar. 15, 2012

(86) PCT No.: PCT/JP2012/001810
§ 371 (c)(1),
(2), (4) Date: Aug. 26, 2014

(87) PCT Pub. No.: WO2013/136368
PCT Pub. Date: Sep. 19, 2013

(65) Prior Publication Data
US 2015/0040595 A1 Feb. 12, 2015

(51) Int. Cl.
*F25B 49/02* (2006.01)
*F25B 13/00* (2006.01)
(Continued)

(52) U.S. Cl.
CPC ............ *F25B 49/02* (2013.01); *F24D 17/001* (2013.01); *F24D 19/1051* (2013.01);
(Continued)

(58) Field of Classification Search
CPC ........ F25B 49/02; F25B 13/00; F25B 49/022; F25B 29/003; F25B 2313/029;
(Continued)

(56) References Cited

U.S. PATENT DOCUMENTS 4,940,079 A * 7/1990 Best ................... F24D 19/1072
165/236
6,109,339 A * 8/2000 Talbert ............... F24D 11/0214
126/101
(Continued)

FOREIGN PATENT DOCUMENTS

JP   55-96876 A    7/1980
JP   61-107066 A   5/1986
(Continued)

OTHER PUBLICATIONS

Office Action mailed May 7, 2015 issued in corresponding JP patent application No. 2014-504462 (and English translation).
(Continued)

*Primary Examiner* — Ljiljana Ciric
(74) *Attorney, Agent, or Firm* — Posz Law Group, PLC

(57) ABSTRACT

A refrigeration cycle apparatus simultaneously performs a cooling operation mode in which a refrigerant from a compressor is caused to flow to an indoor heat exchanger of an indoor unit having a cooling load, and a hot water supply operation mode in which a refrigerant from the compressor is caused to flow to a water heat exchanger of a hot water supply unit having a hot water supply demand. An operation control part switches the control mode of the simultaneous cooling and heating and hot water supply operation mode between a cooling-prioritized mode and a hot-water-supply-prioritized mode according to the relationship between the cooling load and the hot water supply load.

14 Claims, 8 Drawing Sheets

(51) Int. Cl.

| | | |
|---|---|---|
| *F24D 17/00* | (2006.01) | |
| *F24D 19/10* | (2006.01) | |
| *F24F 3/06* | (2006.01) | |
| *F24F 5/00* | (2006.01) | |
| *F25B 29/00* | (2006.01) | |

(52) U.S. Cl.
CPC ............ *F24F 3/065* (2013.01); *F24F 5/0096* (2013.01); *F25B 13/00* (2013.01); *F25B 29/003* (2013.01); *F25B 49/022* (2013.01); *F24D 2200/22* (2013.01); *F25B 2313/003* (2013.01); *F25B 2313/029* (2013.01); *F25B 2313/0231* (2013.01); *F25B 2313/02742* (2013.01); *F25B 2313/0314* (2013.01); *F25B 2313/0315* (2013.01)

(58) Field of Classification Search
CPC .... F25B 2313/02742; F25B 2313/0314; F25B 2313/0315; F24D 17/001; F24D 19/1051; F24D 2200/22; F24F 3/065; F24F 5/0096
See application file for complete search history.

(56) References Cited

U.S. PATENT DOCUMENTS

| | | | | |
|---|---|---|---|---|
| 7,152,413 | B1* | 12/2006 | Anderson | F24F 5/0017 62/118 |
| 7,363,772 | B2* | 4/2008 | Narayanamurthy | F24F 5/0017 62/333 |
| 8,056,348 | B2* | 11/2011 | Murakami | F25B 13/00 62/149 |
| 8,074,459 | B2* | 12/2011 | Murakami | F25B 13/00 62/159 |
| 8,079,229 | B2* | 12/2011 | Lifson | F24D 17/02 62/113 |
| 8,146,375 | B2* | 4/2012 | Mohs | F25D 16/00 62/113 |
| 8,166,773 | B2* | 5/2012 | Immink | F25B 7/00 62/324.1 |
| 8,172,153 | B1* | 5/2012 | Kennedy | F24D 19/1048 236/1 B |
| 8,181,470 | B2* | 5/2012 | Narayanamurthy | F25D 16/00 62/113 |
| 8,220,531 | B2* | 7/2012 | Murakami | F25B 13/00 165/240 |
| 8,234,876 | B2* | 8/2012 | Parsonnet | F24F 5/0017 62/436 |
| 8,756,943 | B2* | 6/2014 | Chen | F25B 13/00 62/160 |
| 8,789,382 | B2* | 7/2014 | Ko | F25B 1/04 62/159 |
| 9,127,851 | B2* | 9/2015 | Yang | F24F 5/001 |
| 9,151,486 | B2* | 10/2015 | Cho | F22B 1/28 |
| 9,181,939 | B2* | 11/2015 | Pham | F04B 35/04 |
| 9,182,142 | B2* | 11/2015 | Wen | F24F 11/0012 |
| 9,212,834 | B2* | 12/2015 | Parsonnet | F25B 1/00 |
| 9,383,126 | B2* | 7/2016 | Chen | F25B 29/003 |
| 9,405,304 | B2* | 8/2016 | Branecky | G05D 23/1923 |
| 9,416,987 | B2* | 8/2016 | Ragland | F24F 11/0012 |
| 2006/0218948 | A1 | 10/2006 | Otake et al. | |
| 2006/0230770 | A1* | 10/2006 | Kitsch | F25B 13/00 62/151 |
| 2007/0012418 | A1* | 1/2007 | Cho | F25B 13/00 165/58 |
| 2012/0222440 | A1* | 9/2012 | Matsui | F25B 7/00 62/159 |

FOREIGN PATENT DOCUMENTS

| | | |
|---|---|---|
| JP | 61-235658 A | 10/1986 |
| JP | 01-281378 A | 11/1989 |
| JP | 2000-111181 A | 4/2000 |
| JP | 2001-248937 A | 9/2001 |
| JP | 2007-232265 A | 9/2007 |
| JP | 2008-138954 A | 6/2008 |
| WO | 2009/028043 A1 | 3/2009 |
| WO | 2011/125111 A1 | 10/2011 |

OTHER PUBLICATIONS

Extended European Search Report issued Nov. 11, 2015 in the corresponding EP application No. 12871423.5.
International Search Report of the International Searching Authority mailed Jun. 19, 2012 for the corresponding international application No. PCT/JP2012/001810 (with English Translation).
EP Office Action of Feb. 13, 2017 in the corresponding EP application No. 12871423.5.

* cited by examiner

F I G. 3
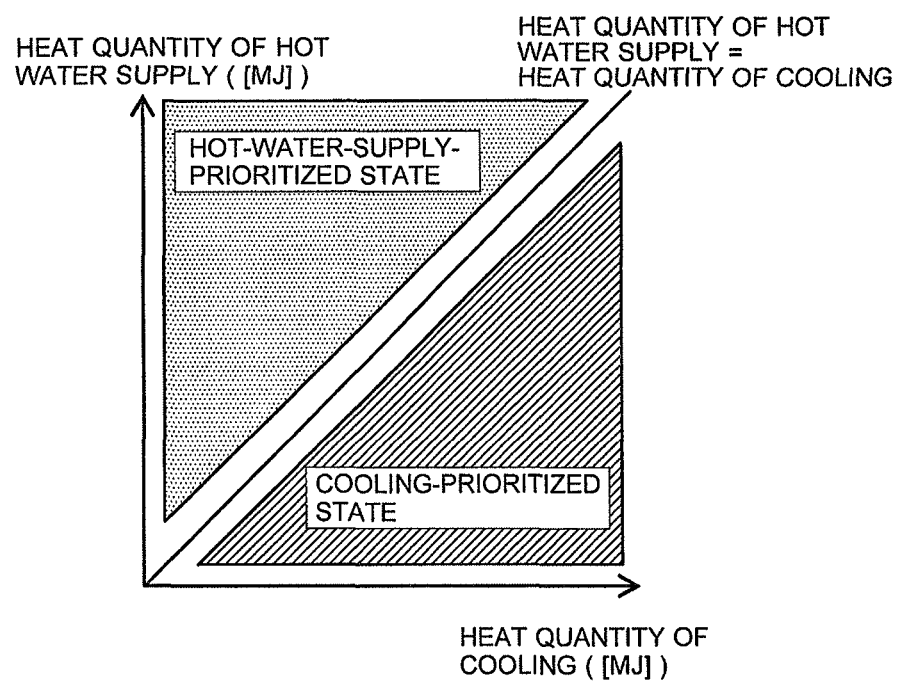

FIG. 4

| | COMPRESSOR 1 | HEAT SOURCE AIR-SENDING DEVICE 5 | HEAT SOURCE PRESSURE REDUCING MECHANISM 6 | INDOOR PRESSURE REDUCING MECHANISMS 8a AND 8b |
|---|---|---|---|---|
| COOLING-PRIORITIZED STATE | EVAPORATING TEMPERATURE CONTROL | HEAT REJECTION PLATE TEMPERATURE CONTROL | MINIMUM OPENING DEGREE (FULLY CLOSED) | DEGREE-OF-SUBCOOLING CONTROL OF WATER HEAT EXCHANGER 16 |
| HOT-WATER-SUPPLY-PRIORITIZED STATE | FIXED FREQUENCY CONTROL | HEAT REJECTION PLATE TEMPERATURE CONTROL OR DEGREE-OF-SUPERHEAT CONTROL OF HEAT-SOURCE-SIDE HEAT EXCHANGER 4 | EVAPORATING TEMPERATURE CONTROL | DEGREE-OF-SUBCOOLING CONTROL OF WATER HEAT EXCHANGER 16 |

REFRIGERATION CYCLE APPARATUS

CROSS REFERENCE TO RELATED APPLICATION

This application is a U.S. national stage application of PCT/JP2012/001810 filed on Mar. 15, 2012, the disclosure of which is incorporated by reference.

TECHNICAL FIELD

The present invention relates to a refrigeration cycle apparatus of a vapor compression type, and particularly, to control of a refrigeration cycle apparatus which is capable of an exhaust heat recovery operation by a simultaneous cooling and hot water supply operation.

BACKGROUND

Conventionally, there have been refrigeration cycle apparatuses which are capable of simultaneously supplying cooling heat and heating heat in a refrigerant circuit formed by connecting a heat source unit and an indoor unit by pipes, (for example, see Patent Literature 1 and Patent Literature 2). These systems recover exhaust heat by simultaneously supplying cooling heat and heating heat, and aim to achieve high operating efficiency.

PATENT LITERATURE

Patent Literature 1: Japanese Unexamined Patent Application Publication No. 2007-232265 (FIG. 1)
Patent Literature 2: Japanese Unexamined Patent Application Publication No. 2008-138954 (FIG. 1)

The refrigeration device disclosed in Patent Literature 1 is configured to have a system in which the quantity of heat absorbed in a cooling heat exchanger, such as a showcase, is able to be recovered as heating heat of an air-conditioning heat exchanger. Furthermore, the refrigeration device disclosed in Patent Literature 2 is configured to achieve a cooling and heating free operation which simultaneously satisfies a cooling demand and a heating demand of each room. By the simultaneous usage of cooling heat and heating heat, the refrigeration device disclosed in Patent Literature 2 is configured to have a system which achieves exhaust heat recovery.

The refrigeration cycle apparatuses disclosed in the Patent Literature 1 and Patent Literature 2 are each configured to have a system which outputs cooling heat and heating heat corresponding to a cooling load and a heating load. In contrast, in the case of a refrigeration cycle apparatus which simultaneously executes cooling and hot water supply, unlike air-conditioning, hot water supply does not have a concept of outputting heat corresponding to a load since the amount of hot water is increased by adding up the amounts of hot water supply heat provided. Thus, the conventional control of exhaust heat recovery cannot be applied as it is to the refrigeration cycle apparatus which simultaneously executes cooling and hot water supply. Accordingly, an operation method which matches a cooling load and an operation method which matches a hot water supply demand need to be established for a simultaneous cooling and hot water supply operation.

Furthermore, conventionally, exhaust heat has been necessary even when either one of a cooling operation and a hot water supply operation is mainly performed. However, since hot water is increased by the amount of hot water supply heat provided, heat exhaustion is not required even when hot water supply heat is generated excessively. In cooling, however, since heat corresponding to a load needs to be output, heat exhaustion is necessary when there is excess cooling heat. In particular, in the case of a multi-type model including a plurality of cooling indoor units connected, when an operation corresponding to hot water supply is performed with a low cooling load, the cooling heat may become excessive, and resulting low pressures decreases to cause trouble in operation. In order to prevent such a state, control of the amount of exhaust heat appropriate for a simultaneous cooling and hot water supply operation is necessary. As described above, a simultaneous cooling and hot water supply operation has a particular way of thinking about control of the amount of exhaust heat.

Furthermore, in hot water supply, it is not necessary to output heat corresponding to a load at a certain moment, and hot water only needs to be boiling by the time that a user uses hot water. Therefore, the timing for switching the operation to match the hot water supply demand may be set freely to some extent. However, if the timing for switching to a hot water supply operation is too early, the overall operation efficiency decreases. In contrast, if the timing for switching to a hot water supply operation is too late, there is a possibility that hot water may run out. Hot water sufficient for some users may be provided merely by executing an operation which matches the cooling load. As described above, in order to avoid running out of hot water while achieving energy saving, the selection of a control method and the timing for switching between operations are very important. Such a timing varies largely depending on how the user uses hot water, and therefore an appropriate setting is required.

Furthermore, in an operation which matches hot water supply, heat corresponding to a load is not output, and the method for outputting hot water supply heat may therefore be freely set. Thus, it is desirable to employ, as a control method, a method of enhancing operation efficiency while maintaining tolerance to running out of hot water. However, in conventional simultaneous cooling and heating operations, the quantity of heat output is fixed according to the load. Therefore, no control method according to the above-mentioned way of thinking has been established.

As described above, in order to achieve an operational procedure which does not impair the comfort of a cooled room, to maintain a high tolerance to running out of hot water, and to increase the operation efficiency, the conventional control methods are not appropriate. Therefore, it is necessary to establish an operation method corresponding to a simultaneous cooling and hot water supply operation.

SUMMARY

The present invention has been made to solve the above-mentioned problems, and an object of the present invention is to obtain a refrigeration cycle apparatus which is at least capable of independently operating a cooling operation and a hot water supply operation and capable of performing a cooling exhaust heat recovery operation for recovering heat exhausted upon cooling to be used as hot water supply heat, wherein high tolerance to running out of hot water and high operation efficiency are achieved, without impairing the comfort of a room, by establishing an equipment control mode corresponding to a cooling load and a hot water supply demand and determining a control mode for the equipment control according to the relationship between the cooling load and the hot water supply demand.

A refrigeration cycle apparatus according to the present invention includes one or more heat source units each including a compressor whose operation frequency is controllable, a heat-source-side heat exchanger, a heat source air-sending device which supplies outside air to the heat-source-side heat exchanger, and a heat source pressure reducing mechanism; a branch unit including an indoor pressure reducing mechanism; one or more indoor units each include an indoor heat exchanger that cools or heats indoor air; one or more hot water supply units each including a hot water storage tank, a water pump, a water heat exchanger that heats water within the hot water storage tank, and a water-side circuit that connects the hot water storage tank, the water pump, and the water heat exchanger by a pipe; a refrigeration cycle in which the compressor, the water heat exchanger, the indoor pressure reducing mechanism, and the indoor heat exchanger are connected by a pipe in that order; an exhaust heat circuit that branches off from between the water heat exchanger and the indoor pressure reducing mechanism, connects the heat source pressure reducing mechanism and the heat-source-side heat exchanger in that order by a pipe, and is connected between the indoor heat exchanger and the compressor; and a controller including an operation control part that controls operations of individual units. The operation control part includes a simultaneous cooling and hot water supply operation mode, in which a cooling operation mode in which a refrigerant from the compressor is caused to flow to the indoor heat exchanger of the indoor unit having a cooling load, and a hot water supply operation in which the refrigerant from the compressor is caused to flow to the water heat exchanger of the hot water supply unit having a hot water supply demand, are performed simultaneously. The operation control part includes, as control modes of the simultaneous cooling and hot water supply operation mode, a cooling-prioritized mode in which the operation frequency of the compressor is controlled according to the cooling load and a hot-water-supply-prioritized mode in which the operation frequency of the compressor is controlled according to the hot water supply demand. The operation control part switches the control mode of the simultaneous cooling and heating and hot water supply operation mode between the cooling-prioritized mode and the hot-water-supply-prioritized mode, according to a relationship between the cooling load and the hot water supply load.

As described above, a refrigeration cycle apparatus having a higher tolerance to running out of hot water and a higher operation efficiency than existing refrigeration cycle apparatuses without impairing the comfort of a room, may be attained.

BRIEF DESCRIPTION OF DRAWINGS

FIG. 3 is a diagram illustrating the state of switching between a cooling-prioritized state and a hot-water-supply-prioritized state with respect to the load balance of the refrigeration cycle apparatus 100 according to Embodiment 1.

FIG. 4 is a diagram illustrating a control method of equipment in the cooling-prioritized state and the hot-water-supply-prioritized state of the refrigeration cycle apparatus 100 according to Embodiment 1.

DETAILED DESCRIPTION

Embodiment 1

<Equipment Configuration>

Figure 1:
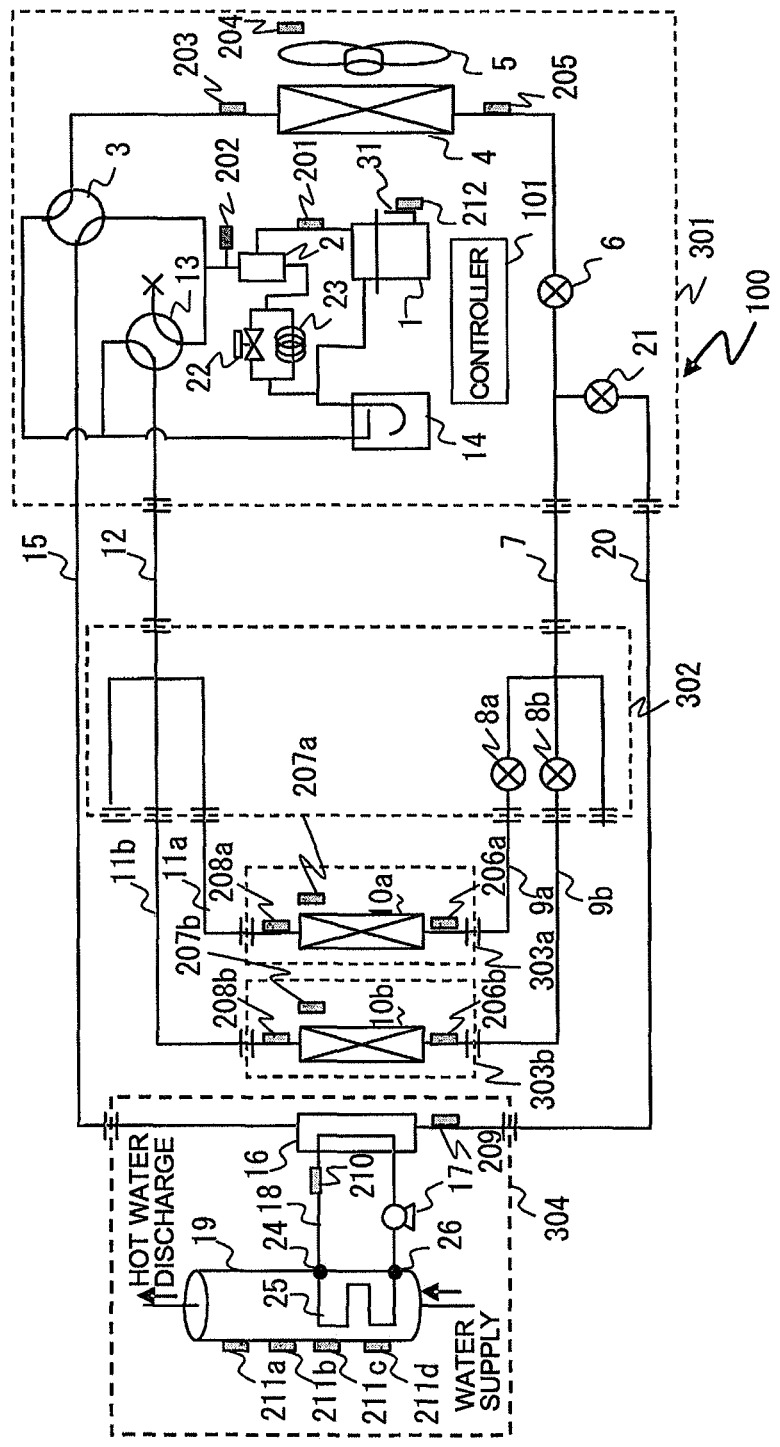
FIG. 1 is a refrigerant circuit diagram of a refrigeration cycle apparatus 100 according to Embodiment 1.

A configuration of an air-conditioning apparatus of Embodiment 1 of the present invention will be described with reference to the drawings. In this description, when units are used for symbols in the text, they are indicated in square brackets [ ]. When there is no dimensions (no units), the notation [-] is used. FIG. 1 is a refrigerant circuit diagram of a refrigeration cycle apparatus 100 according to Embodiment 1. The refrigeration cycle apparatus 100 is installed in general houses, office buildings, and the like. The refrigeration cycle apparatus 100 is able to independently process a cooling instruction (cooling ON/OFF) and a heating instruction (heating ON/OFF) selected in indoor units 303a and 303b, and a hot water supply instruction (hot water supply ON/OFF) to a hot water supply unit 304, by performing a refrigeration cycle operation of a vapor compression type. Furthermore, the refrigeration cycle apparatus is able to simultaneously process a cooling instruction for the indoor units 303a and 303b and a hot water supply instruction for the hot water supply unit 304.

A heat source unit 301 is connected to the indoor units 303a and 303b via a branch unit 302. Therefore, even when the number of indoor units increases, the number of pipes connected to the heat source unit 301 does not increase. The heat source unit 301 and the branch unit 302 are connected by an indoor-side liquid extension main pipe 7, which is a refrigerant pipe, and an indoor-side gas extension main pipe 12, which is a refrigerant pipe. The branch unit 302 and the indoor units 303a and 303b are connected by indoor-side liquid extension branch pipes 9a and 9b and indoor-side gas extension branch pipes 11a and 11b, which are refrigerant pipes. Furthermore, the heat source unit 301 and the hot water supply unit 304 are connected by a water-side gas extension main pipe 15, which is a refrigerant pipe, and a water-side liquid extension main pipe 20, which is a refrigerant pipe. The refrigerant used for the air-conditioning apparatus is not particularly limited. For example, R410A, R32, HFO-1234yf, a natural refrigerant, such as hydrocarbon, or the like may be used.

<Heat Source Unit 301>

The heat source unit 301 is configured to include a compressor 1, an oil separator 2, four-way valves 3 and 13, a heat-source-side heat exchanger 4, a heat source air-sending device 5, a heat source pressure reducing mechanism 6, a hot water supply pressure reducing mechanism 21, an accumulator 14, a solenoid valve 22, and a capillary tube 23. The compressor 1 sucks a refrigerant and compresses the refrigerant into a high-temperature, high-pressure state, and is, for example, of a type in which the rotation speed is controlled by an inverter. The oil separator 2 is connected in order to separate oil flowed out of the compressor 1 and return the oil to the compressor 1. The separated oil passes through the capillary tube 23 and returns to a pipe between the compressor 1 and the accumulator 14, and flows to the compressor 1. The heat-source-side heat exchanger 4 is, for example, a fin-and-tube-type heat exchanger of a cross-fin type, each of which includes a heat transfer pipe and numerous fins. The heat-source-side heat exchanger 4 exchanges heat between the outside air and the refrigerant, and exhausts heat. Furthermore, the heat source air-sending device 5 includes a fan which is capable of varying the flow rate of the air supplied to the heat-source-side heat exchanger 4. The heat source air-sending device 5 is, for example, a propeller fan which is driven by a motor including a DC fan motor (not illustrated).

The heat source pressure reducing mechanism 6 and the hot water supply pressure reducing mechanism 21 control the flow rate of the refrigerant, and may set the opening degree in a variable manner. Furthermore, by controlling the heat source pressure reducing mechanism 6, the hot water supply pressure reducing mechanism 21, the solenoid valve 22, and the four-way valves 3 and 13, it is possible to set the flow direction of the refrigerant. The accumulator 14 has a function of storing the refrigerant excessive for an operation. The accumulator 14 also has a function of preventing, by retaining a liquid refrigerant which is generated temporarily when the operation state is changed, a large amount of liquid refrigerant from flowing into the compressor 1.

Furthermore, in the heat source unit 301, when the current increases due to, for example, an increase in the compressor frequency, in accordance with an operation, for example, an electronic substrate for driving the compressor will generate heat, and the temperature of the electronic substrate will rise. When this temperature becomes too high, there is a possibility that the electronic substrate may become damaged. Usually, a heat radiation plate 31 for rejecting generated heat is therefore attached to the electronic substrate. The heat radiation plate 31 is located within the air path of the heat source air-sending device 5, and is able to reject heat of the electronic substrate in the heat source unit 301 by the blowing of air from the heat source air-sending device 5.

Furthermore, a pressure sensor 201 is provided at the discharge side of the compressor 1 of the heat source unit 301, and measures the refrigerant pressure of the area where the pressure sensor 201 is installed. Moreover, a temperature sensor 202 is provided at the discharge side of the compressor 1, a temperature sensor 203 is provided at the gas side of the heat-source-side heat exchanger 4, and a temperature sensor 205 is provided at the liquid side of the heat-source-side heat exchanger 4. The temperature sensors 202, 203, and 205 measure the refrigerant temperature of the areas where they are installed. Furthermore, a temperature sensor 204 is provided at the air inlet, and measures the air temperature of the area where the temperature sensor 204 is installed. In addition, a temperature sensor 212 is provided on the heat radiation plate 31, and measures the temperature of the heat radiation plate.

<Branch Unit 302>

The branch unit 302 is configured to include indoor pressure reducing mechanisms 8a and 8b. The indoor pressure reducing mechanisms 8a and 8b control the flow rate of the refrigerant, and the opening degree can be set in a variable manner. Furthermore, by controlling the indoor pressure reducing mechanisms 8a and 8b, it is possible to set the flow direction of the refrigerant.

<Indoor Units 303a and 303b>

The indoor units 303a and 303b are configured to include indoor-side heat exchangers 10a and 10b. The indoor-side heat exchangers 10a and 10b are, for example, fin-and-tube-type heat exchangers of a cross-fin type, each of which includes a heat transfer pipe and numerous fins. The indoor-side heat exchangers 10a and 10b exchanges heat between the indoor air and the refrigerant.

Temperature sensors 206a and 206b are provided at the liquid side of the indoor-side heat exchangers 10a and 10b of the indoor units 303a and 303b, and temperature sensors 208a and 208b are provided at the gas side of the indoor heat exchangers 10a and 10b of the indoor units 303a and 303b. The temperature sensors 206a, 206b, 208a, and 208b detect the refrigerant temperature of the areas where they are installed. Furthermore, temperature sensors 207a and 207b are provided at air inlets, and measure the air temperature of the areas where they are installed.

<Hot Water Supply Unit 304>

The hot water supply unit 304 is configured to include a water heat exchanger 16, a water-side circuit 18, a water pump 17, a hot water storage tank 19, and a heat transfer coil 25. The water-side circuit 18 connects the water heat exchanger 16 and the hot water storage tank 19. A heat medium circulates through the water-side circuit 18 as intermediate water. The heat medium is, for example, water, Nybrine, ethylene glycol, or the like. The water heat exchanger 16 is configured to be, for example, a plate-shaped heat exchanger, and heats the heat medium by exchanging heat between the heat medium and the refrigerant. The water pump 17 has a function of causing the heat medium to circulate in the water-side circuit 18. The water pump 17 may be configured to be capable of varying the flow rate of the heat medium supplied to the water heat exchanger 16 or may be configured to maintain the flow rate of the heat medium constant. The hot water storage tank 19 has a function of storing hot water that has been boiled. The hot water storage tank 19 is of a full water type. Hot water is discharged from the top of the tank according to a hot water supply demand on the load side, and low-temperature tap water corresponding to the decreased amount of hot water in the hot water storage tank 19 at the time of discharging is supplied from the bottom of the tank.

The heat medium sent by the water pump 17 is heated by the refrigerant at the water heat exchanger 16, and the temperature of the heat medium rises. Then, the heat medium passes through a connection point 24 and flows into the hot water storage tank 19. Without mixing with water in the hot water storage tank 19, the heat medium exchanges heat with water at the heat transfer coil 25, and the temperature of the heat medium falls. After that, the heat medium flows out of the hot water storage tank 19 via a connection point 26, flows to the water pump 17, and flows into the water heat exchanger 16 again. In such a process, hot water is boiled in the hot water storage tank 19.

The heat transfer coil 25 is located in a lower part of the hot water storage tank 19. The connection point 24 and the connection point 26 are located at lower parts of the hot water storage tank 19. Hot water is discharged from the top of the tank and low-temperature tap water is supplied from the bottom of the tank. Therefore, low-temperature water is present at the lower part of the tank. In Embodiment 1, even when water is heated at the heat transfer coil 25, if the water temperature is low, it is not possible to turn water in the hot water storage tank 19 into high-temperature water in a single heat exchange operation. As an operation, an operation for gradually increasing the temperature of the low-temperature water in the hot water storage tank 19 is performed. By a plurality of heat exchange operations at the heat transfer coil 25, the water temperature of the hot water storage tank 19 rises, and hot water is thus created. This method of boiling is called circulation heating. In circulation heating, by increasing the temperature of water at the heat transfer coil 25, for example, by 5 degrees Celsius, the tank water temperature of the hot water storage tank 19 will be increased. Therefore, the temperature of the heat medium at the heat transfer coil 25 will also be increased by 5 degrees Celsius. As a result, the inlet temperature of the water heat exchanger 16 will rise to 25 degrees Celsius, 30 degrees Celsius, and so on, and the outlet temperature will accordingly rise to 30 degrees Celsius, 35 degrees Celsius, and so on.

Furthermore, a temperature sensor 209 is installed at the liquid side of a refrigerant-side circuit of the water heat exchanger 16 in the hot water supply unit 304, and detects the refrigerant temperature of the area where the temperature sensor 209 is installed. Moreover, a temperature sensor 210 is installed at the downstream of the water heat exchanger 16 of the water-side circuit 18, and temperature sensors 211a to 211d are installed on tank wall surfaces of the hot water storage tank 19. The temperature sensors 210 and 211a to 211d detect the water temperature of the areas where they are installed. The temperature sensors 211a to 211d are installed in this order from the temperature sensor 211a, the temperature sensor 211b, the temperature sensor 211b, and the temperature sensor 211c, from the upper part towards the lower part of the hot water storage tank 19.

<Controller 101>

Figure 2:
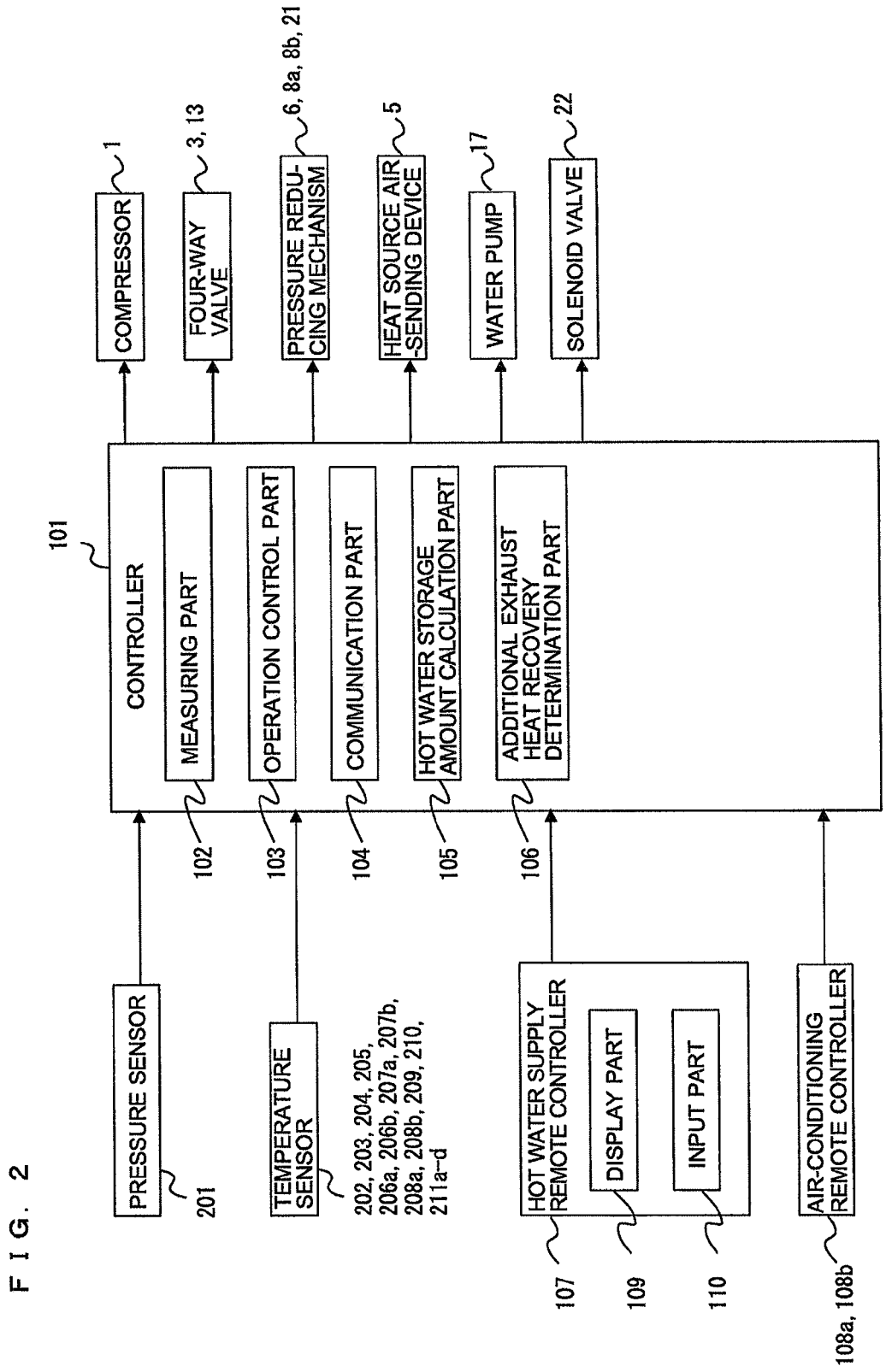
FIG. 2 is a block diagram of a controller of the refrigeration cycle apparatus 100 according to Embodiment 1.

A controller 101 which is configured to include, for example, a microcomputer, is provided within the heat source unit 301. FIG. 2 is a block diagram illustrating a configuration of the controller 101 according to Embodiment 1 of the present invention. Measurement values detected by various temperature sensors and pressure sensors are input to a measuring part 102. Based on information input, an operation control part 103 controls the compressor 1, the solenoid valve 22, the four-way valves 3 and 13, the heat source air-sending device 5, the heat source pressure reducing mechanism 6, the indoor pressure reducing mechanisms 8a and 8b, the water pump 17, and the like. Furthermore, the controller 101 also includes a communication part 104 which is capable of inputting communication data information from communication means, such as a telephone line, a LAN line, or a radio, and outputting information to an external device. The communication part 104 receives a hot water supply instruction (hot water supply ON/hot water supply OFF) output from a hot water supply remote controller 107, a set hot water discharge temperature, and the like, and inputs the received instruction, temperature, and the like to the controller 101. Furthermore, the communication part 104 receives a cooling instruction (cooling ON/OFF) or a heating instruction (heating ON/OFF) output from air-conditioning remote controllers 108a and 108b, and inputs the instructions to the controller 101. It is specified that as well as input from the hot water supply remote controller 107, a hot water supply demand is input to the controller 101 automatically when the amount of hot water storage in the hot water storage tank 19 becomes lower than or equal to a predetermined value, for example, when the amount of hot water storage becomes less than or equal to 50 percent. The controller 101 also includes a hot water storage amount calculation part 105 which calculates the amount of hot water storage of the hot water storage tank 19. Furthermore, the controller 101 includes an additional exhaust heat recovery determination part 106 which determines whether or not to execute a simultaneous cooling and hot water supply operation in the case where there is a cooling load, that is, the status is cooling ON, and there is no hot water supply demand. The hot water supply remote controller 107 includes a display part 109 which displays the operation state and an input part 110 which inputs an instruction from a user on the refrigeration cycle apparatus 100.

The hot water storage amount calculation part 105 calculates the amount of hot water storage by, for example, the way to be described below. First, the hot water storage tank 19 is divided in a height direction by individual installment locations of the temperature sensors 211a to 211d, which are provided in the height direction of the hot water storage tank 19. Then, based on measurement data of the temperature sensors 211 at the top end and the bottom end of the individual divided sections measured by the measuring part 102, the hot water storage calculation part 105 calculates an average temperature for the individual divided sections. As the average temperature, the highest section uses the temperature of the temperature sensor 211 at the bottom end, and the lowest section uses the temperature of the temperature sensor 211 at the top end. Then, the heat quantity of hot water storage in each of the divided sections is estimated by multiplying the amount of hot water and the specific heat of water in each of the divided sections with a value obtained by subtracting the tap water temperature from the average temperature. The estimated heat quantities of hot water storage in the individual divided sections are added up, and the obtained value is defined as the heat quantity of hot water storage in the hot water storage tank 19. Here, the amount of hot water in each of the divided sections is obtained by dividing the internal volume of the hot water storage tank 19 by a value obtained by adding 1 to the number of the temperature sensors 211 installed. Furthermore, tap water is fixed at, for example, 15 degrees Celsius. The amount of hot water storage in the case where all of the measurement values of the temperature sensors 211a to 211d are at the hot water discharge temperature, is set to 100%. The amount of hot water storage is obtained by dividing the heat quantity of hot water storage obtained from the temperature sensors 211a to 211d of the measurement values by the heat quantity of hot water storage in the case where the amount of hot water storage is 100%.

<Operation Modes>

The refrigeration cycle apparatus 100 performs control of equipment equipped in the heat source unit 301, the branch unit 302, the indoor units 303a and 303b, and the hot water supply unit 304 in accordance with air-conditioning loads demanded by the indoor units 303a and 303b and a hot water supply demand by the hot water supply unit 304. By performing the above control, the refrigeration cycle apparatus 100 executes a cooling operation mode A, a heating operation mode B, a hot water supply operation mode C, and a simultaneous cooling and hot water supply operation mode D. Operational procedure for each of the operation modes will be described below.

[Cooling Operation Mode A]

First, the cooling operation mode A will be described. In the cooling operation mode A, the four-way valve 3 connects the discharge side of the compressor 1 with the gas side of the heat-source-side heat exchanger 4, and connects the suction side of the compressor 1 with the water heat exchanger 16. Further, the four-way valve 13 connects the suction side of the compressor 1 with each of the gas sides of the indoor-side heat exchangers 10a and 10b. The solenoid valve 22 is closed. The heat source pressure reducing mechanism 6 is at a maximum opening degree (fully opened) and the hot water supply pressure reducing mechanism 21 is at a minimum opening degree (fully closed).

A high-temperature, high-pressure gas refrigerant discharged from the compressor 1 flows into the heat-source-side heat exchanger 4 via the oil separator 2 and the four-way valve 3, exchanges heat with outdoor air, and turns into a high-pressure liquid refrigerant. Then, the refrigerant flows out of the heat-source-side heat exchanger 4, and flows through the heat source pressure reducing mechanism 6. After that, the refrigerant flows out of the heat source unit 301, flows into the branch unit 302 via the indoor liquid extension main pipe 7, is decompressed by the indoor pressure reducing mechanisms 8a and 8b into a low-pressure, two-phase refrigerant, and flows out of the branch unit 302. The refrigerant then flows into the indoor units 303a and 303b via the indoor liquid extension branch pipes 9a and 9b, cools indoor air at the indoor-side heat exchanger 8, and turns into a low-pressure gas refrigerant. Then, the refrigerant flows out of the indoor units 303a and 303b, passes through the indoor gas extension branch pipes 11a and 11b, the branch unit 302, and the indoor gas extension main pipe 12, flows into the indoor unit 301, passes through the four-way valve 13, flows through the accumulator 14, and is again sucked into the compressor 1. The hot water supply unit 304 is suspended, and therefore, no refrigerant flows in a portion between the hot water supply pressure reducing mechanism 21 and the four-way valve 3, which is filled with a gas-phase refrigerant.

Opening degrees of the indoor pressure reducing mechanisms 8a and 8b are controlled in total so that the degree of subcooling of the heat-source-side heat exchanger 4 is a predetermined value. The degree of subcooling of the heat-source-side heat exchanger 4 is a value obtained by subtracting the temperature detected by the temperature sensor 205 from a saturated liquid temperature at a pressure detected by the pressure sensor 201. Further, the operation frequency of the compressor 1 is controlled so that the evaporating temperature is a predetermined value. The evaporating temperature is a temperature detected by the temperature sensors 206a and 206b. Furthermore, the heat source air-sending device 5 is controlled so that the condensing temperature is a predetermined value. The condensing temperature is a saturated gas temperature at a pressure detected by the pressure sensor 201.

[Heating Operation Mode B]

Next, a heating operation mode B will be described. In the heating operation mode B, the four-way valve 3 connects the discharge side of the compressor 1 with the gas side of the water heat exchanger 16, and connects the suction side of the compressor 1 with the gas side of the heat-source-side heat exchanger 4. The four-way valve 13 connects the discharge side of the compressor 1 with each of the gas sides of the indoor heat exchangers 10a and 10b. The solenoid valve 22 is closed. The outdoor pressure reducing mechanism 6 is at a maximum opening degree (fully opened) and the hot water supply pressure reducing mechanism 21 is fixed to such an opening degree that a refrigerant does not stay in a portion between the hot water supply gas extension main pipe 15 and the hot water supply liquid extension main pipe 20.

A high-temperature, high-pressure gas refrigerant discharged from the compressor 1 flows out of the heat source unit 301 via the oil separator 2 and the four-way valve 13, passes through the indoor gas extension main pipe 12, the branch unit 302, and the indoor gas extension branch pipes 11a and 11b, and flows into the indoor units 303a and 303b. Then, the refrigerant flows into the indoor-side heat exchangers 10a and 10b, heats indoor air, turns into a high-pressure liquid refrigerant, and flows out of the indoor-side heat exchangers 10a and 10b. Then, the refrigerant flows out of the indoor units 303a and 303b, flows into the branch unit 302 via the indoor liquid extension branch pipes 9a and 9b, is decompressed by the indoor pressure reducing mechanisms 8a and 8b, and turns into a low-pressure, two-phase refrigerant. After that, the refrigerant flows out of the branch unit 302, flows into the heat source unit 301 via the indoor liquid extension main pipe 7, passes through the heat source pressure reducing mechanism 6, flows into the heat-source-side heat exchanger 4, exchanges heat with outdoor air, and turns into a low-pressure gas refrigerant. The gas refrigerant flows out of the heat-source-side heat exchanger 4, passes through the four-way valve 3, flows through the accumulator 14, and is again sucked into the compressor 1. The hot water supply unit 304 is suspended, and therefore, no refrigerant flows in a portion between the four-way valve 3 and the hot water supply pressure reducing mechanism 21, which is filled with a gas-phase refrigerant.

Opening degrees of the indoor pressure reducing mechanisms 8a and 8b are controlled so that the degree of subcooling of the indoor-side heat exchangers 10a and 10b is a predetermined value. The degree of subcooling of the indoor-side heat exchangers 10a and 10b is a value obtained by subtracting the temperature detected by the temperature sensors 206a and 206b from a saturated liquid temperature detected by the pressure sensor 201. Further, the operation frequency of the compressor 1 is controlled so that the condensing temperature is a predetermined value. The condensing temperature is a saturated gas temperature at a pressure detected by the pressure sensor 201. Furthermore, the heat source air-sending device 5 is controlled so that the evaporating temperature is a predetermined value. The evaporating temperature is a temperature detected by the temperature sensor 205.

[Hot Water Supply Operation Mode C]

Next, a hot water supply operation mode C will be described. In the hot water supply operation mode C, the four-way valve 3 connects the discharge side of the compressor 1 with the gas side of the water heat exchanger 16, and connects the suction side of the compressor 1 with the gas side of the heat-source-side heat exchanger 4. The four-way valve 13 connects the suction side of the compressor 1 with each of the gas sides of the indoor heat exchangers 10a and 10b. The solenoid valve 22 is closed. The indoor pressure reducing mechanisms 8a and 8b are at a minimum opening degree (fully closed) and the hot water supply pressure reducing mechanism 21 is at a maximum opening degree (fully opened).

A high-temperature, high-pressure gas refrigerant discharged from the compressor 1 flows out of the heat source unit 301 via the oil separator 2 and the four-way valve 3. Then, the refrigerant flows into the hot water supply unit 304 via the hot water supply gas extension main pipe 15, flows into the water heat exchanger 16, heats water supplied by the water pump 17, and turns into a high-pressure liquid refrigerant. Then, after the refrigerant flows out of the water heat exchanger 16 and the hot water supply unit 304, the refrigerant flows into the heat source unit 301 via the hot water supply liquid extension main pipe 20. Then, the refrigerant passes through the hot water supply pressure reducing mechanism 21, is decompressed by the heat source pressure reducing mechanism 6, and turns into a low-pressure, two-phase refrigerant. After passing through the heat source pressure reducing mechanism 6, the refrigerant flows into the heat-source-side heat exchanger 4, cools outdoor air, and turns into a low-pressure gas refrigerant. The refrigerant flows out of the outdoor heat exchanger 4, passes through the accumulator 14 via the four-way valve 3, and is sucked into the compressor 1 again. The indoor units 303a and 303b are suspended, and therefore, no refrigerant flows in a portion between the indoor liquid extension main pipe 7 and the four-way valve 13, which is filled with a gas-phase refrigerant.

The opening degree of the heat source pressure reducing mechanism 6 is controlled so that the degree of subcooling of the water heat exchanger 16 is a predetermined value. The degree of subcooling of the water heat exchanger 16 is a value obtained by subtracting a temperature detected by the temperature sensor 209 from a saturated liquid temperature at a pressure detected by the pressure sensor 201. The pressure sensor 201 and the temperature sensor 209 operate as degree-of-subcooling detection means of the water heat exchanger 16. Further, the frequency of the compressor 1 is controlled to a maximum frequency. The condensing temperature is a saturated gas temperature at a pressure detected by the pressure sensor 201. Furthermore, the heat source air-sending device 5 is controlled so that the evaporating temperature is a predetermined value. The evaporating temperature is a temperature detected by the temperature sensor 205.

Thus, the refrigeration cycle apparatus 100 is capable of independently performing indoor cooling, heating, and hot water supply. Specifically, through a cooling instruction (cooling ON/OFF) or a heating instruction (heating ON/OFF) selected by the indoor units 303a and 303b, and a hot water supply instruction (hot water supply ON/OFF) by the hot water supply unit 304, it is possible to operate the cooling operation mode A, the heating operation mode B, and the hot water supply operation mode C. Further, the refrigeration cycle apparatus 100 may be in the cooling-ON state of the indoor units 303a and 303b and the hot-water-supply-ON state of the hot water supply unit 304, at the same time.

[Simultaneous Cooling and Hot Water Supply Operation Mode (First Simultaneous Cooling and Hot Water Supply Operation Mode) D]

Next, a simultaneous cooling and hot water supply operation mode D will be described. In the simultaneous cooling and hot water supply operation mode D, the four-way valve 3 connects the discharge side of the compressor 1 with the gas side of the water heat exchanger 16, and connects the suction side of the compressor 1 with the gas side of the heat-source-side heat exchanger 4. The four-way valve 13 connects the suction side of the compressor 1 with each of the gas sides of the indoor heat exchangers 10a and 10b. The solenoid valve 22 is closed. The hot water supply pressure reducing mechanism 21 is at a maximum opening degree (fully opened).

A high-temperature, high-pressure gas refrigerant discharged from the compressor 1 passes through the oil separator 2 and the four-way valve 3, flows out of the heat source unit 301, and flows into the hot water supply unit 304 via the hot water supply gas extension main pipe 15. The refrigerant flowing into the hot water supply unit 304, flows into the water heat exchanger 16, heats water supplied by the water pump 17, turns into a high-pressure liquid refrigerant, and flows out of the water heat exchanger 16. Then, the refrigerant flows out of the hot water supply unit 304, flows into the heat source unit 301 via the hot water supply liquid extension main pipe 20, and after passing through the hot water supply pressure reducing mechanism 21, the refrigerant is divided into two flows: one flowing out of the heat source unit 301 and flows through the indoor liquid extension main pipe 7, and the other flowing into the heat source pressure reducing mechanism 6. The refrigerant that has flowed through the indoor liquid extension main pipe 7 flows into the branch unit 302, is decompressed by the indoor pressure reducing mechanisms 8a and 8b, turns into a low-pressure, two-phase refrigerant, and flows out of the branch unit 302. After that, the refrigerant flows into the indoor units 303a and 303b via the indoor liquid extension branch pipes 9a and 9b, flows into the indoor heat exchangers 10a and 10b, cools indoor air, and turns into a low-pressure gas refrigerant. The refrigerant that has flowed through the indoor heat exchangers 10a and 10b, flows out of the indoor units 303a and 303b, passes through the indoor gas extension branch pipes 11a and 11b, the branch unit 302, and the indoor gas extension main pipe 12, flows through the four-way valve 13, and merges with the refrigerant that flows through the heat source pressure reducing mechanism 6. On the other hand, the refrigerant flowing through the heat source pressure reducing mechanism 6 is decompressed, turns into a low-pressure, two-phase refrigerant, flows into the heat-source-side heat exchanger 4, cools outdoor air, and turns into a low-pressure gas refrigerant. Then, the refrigerant merges with the refrigerant that flows into the indoor liquid extension main pipe 7 via the four-way valve 3. The merged refrigerant passes through the accumulator 14 and is sucked into the compressor 1 again.

Since a cooling load and a hot water supply demand exist at the same time in the simultaneous cooling and hot water supply operation mode D, a control method of equipment is distinguished depending on whether the control method is a cooling-prioritized control method, in which an operation is controlled in accordance with the cooling load, or a hot-water-supply-prioritized control method, in which an operation is controlled in accordance with the hot water supply demand. That is, control modes of the simultaneous cooling and hot water supply operation mode D include a cooling-prioritized state (cooling-prioritized mode) and a hot-water-supply-prioritized state (hot-water-supply-prioritized mode). In the cooling-prioritized state, an operation is performed in accordance with a cooling load, and no heat is exhausted. Therefore, the cooling-prioritized state has a higher energy-saving performance than the hot-water-supply-prioritized state. In the hot-water-supply-prioritized state, an operation is performed in accordance with a hot water supply demand, and completion of hot water supply is achieved in a short time. Therefore, the hot-water-supply-prioritized state has a high tolerance to running out of hot water. Considering those characteristics, it is desired to basically operate in the cooling-prioritized state to aim for a high energy-saving performance. When a hot water supply action continues to be performed for a time longer than a predetermined time, that is, when the hot water supply operation mode C and the simultaneous cooling and hot water supply operation mode D continue to operate for a time longer than the predetermined time, for example, for 2 hours or longer, then, an operation is performed in the hot-water-supply-prioritized mode.

FIG. 3 is a diagram illustrating the state of selection between the cooling-prioritized state and the hot-water-supply-prioritized state with respect to the load balance between cooling and hot water supply. In the case where the cooling load is large and the heat quantity of cooling is greater than the heat quantity of hot water supply, a cooling-prioritized operation is selected. In contrast, in the case where the amount of hot water storage is small and the heat quantity of hot water supply is greater than the heat quantity of cooling, a hot-water-supply-prioritized operation is selected. That is, depending on the relationship between the cooling load and the hot water supply load, the selection of the control mode between the cooling-prioritized mode and the hot-water-supply-prioritized mode is made. FIG. 4 is a diagram illustrating a control method of equipment in the cooling-prioritized state and the hot-water-supply-prioritized state. Hereinafter, the control method of equipment in each of the two states will be explained.

If the cooling-prioritized mode is selected, the indoor pressure reducing mechanisms 8a and 8b are controlled so that the degree of subcooling of the water heat exchanger 16 is a predetermined value. The compressor 1 is controlled by the operation control part 103 so that the evaporating temperature is an evaporating temperature target value. The evaporating temperature is a temperature detected by the temperature sensors 206a and 206b (act as evaporating temperature detection means). Further, the evaporating temperature target value varies according to a maximum indoor temperature difference. The maximum indoor temperature difference is a maximum value of a temperature difference of the indoor units 303a and 303b. The temperature difference of the indoor units 303a and 303b is a value obtained by subtracting a set room temperature from temperatures detected by the temperature sensors 207a and 207b (act as indoor temperature measuring means). As the maximum indoor temperature difference increases, the cooling capacity is determined to be larger, and the evaporating temperature target value decreases. The heat source pressure reducing mechanism 6 is controlled to a minimum opening degree (fully closed) by the operation control part 103. This is because, since the compressor 1 operates in accordance with the cooling load, there is no need to exhaust heat by letting a refrigerant flow to the heat-source-side heat exchanger 4. The heat source air-sending device 5 is controlled by the operation control part 103 so that the temperature of the heat radiation plate is a target value. The temperature of the heat radiation plate is a temperature detected by the temperature sensor 212 (acts as heat radiation plate temperature detection means). The target value of the temperature of the heat radiation plate is set to a maximum temperature at which abnormalities do not occur in the electronic substrate for driving the compressor. This allows the air amount of the heat source air-sending device 5 to be a required minimum. The operation efficiency increases by the amount corresponding to a decrease in power input of the motor.

If the hot-water-supply-prioritized mode is selected, the indoor pressure reducing mechanisms 8a and 8b are controlled in a manner similar to the cooling-prioritized mode. The compressor 1 is controlled by the operation control part 103 so that the frequency is fixed at a frequency, such as a maximum frequency or 75% of the maximum frequency. Since the compressor 1 is controlled to the fixed frequency independent of the cooling load, the cooling capacity may become excessive and indoor air may be cooled too much. Therefore, the comfort of the room may be impaired. To avoid this, it is necessary, by adjusting the opening degree of the heat source pressure reducing mechanism 6, to divide the refrigerant into two flows: one flowing into the indoor heat exchangers 10a and 10b; and the other flowing into the heat-source-side heat exchanger 4. That is, it is necessary to exhaust heat of excess cooling capacity by the heat-source-side heat exchanger 4.

The opening degree of the heat source pressure reducing mechanism 6 is controlled by the operation control part 103 so that the evaporating temperature is an evaporating temperature target value. This aims at, since the compressor 1 operates in accordance with a hot water supply demand, exhausting excess cooling heat by letting a refrigerant flow to the heat-source-side heat exchanger 4. By adjusting the distribution amount of the refrigerant by the heat source pressure reducing mechanism 6 so that the evaporating temperature is the predetermined value, a predetermined cooling capacity of the indoor-side heat exchangers 10a and 10b is secured. The evaporating temperature target value varies according to a maximum indoor temperature difference. As the maximum indoor temperature difference increases, the cooling capacity is determined to be larger, and the evaporating temperature target value decreases. When the heat source pressure reducing mechanism 6 is opened, the ratio of the cooling capacity treated by the heat-source-side heat exchanger 4 increases, and thereby the evaporating temperature increases. In contrast, when the heat source pressure reducing mechanism 6 is throttled, the evaporating temperature decreases. In the cooling-prioritized state, the evaporating temperature is controlled by the compressor 1, while in the hot-water-supply-prioritized state, the evaporating temperature is controlled by the heat source pressure reducing mechanism 6. Therefore, the cooling capacity provided to the indoor-side heat exchangers 10a and 10b can be adjusted. Therefore, even if the operation frequency of the compressor 1 is increased to avoid running out of hot water, a state in which a room is cooled too much can be prevented, and the comfort of the room may not be impaired.

The rotation speed of the heat source air-sending device 5 is controlled by the operation control part 103 so that the temperature of the heat radiation plate is a target value. Further, when the degree of superheat of the heat-source-side heat exchanger 4 is lower than or equal to a predetermined value, for example, 2 degrees Celsius or below, the rotation speed of the heat source air-sending device 5 is increased and the amount of air is thereby increased so that the degree of superheat is equal to or higher than the predetermined value. The degree of superheat of the heat-source-side heat exchanger 4 is a value obtained by subtracting a temperature detected by the temperature sensor 205 from a temperature detected by the temperature sensor 203 (the temperature sensor 203 and the temperature sensor 205 act as heat-source-side degree-of-superheat detection means). In the state where the degree of superheat of the heat-source-side heat exchanger 4 is not secured at or over the predetermined value, a large portion is occupied by a two-phase refrigerant with high heat-transfer performance, which means that heat of excess cooling capacity is not exhausted efficiently. To solve this, the amount of air sent from the heat source air-sending device 5 is increased so as to heat the refrigerant up until it turns into a gas phase and to secure the required amount of exhaust heat.

In the case where the degree of superheat of the heat-source-side heat exchanger 4 is not secured at or over the predetermined value, while the rotation speed of the heat source air-sending device 5 is maximum, an excessive amount of refrigerant flows to the heat-source-side heat exchanger 4. In such a case, by reducing the opening degree of the heat source pressure reducing mechanism 6 and thereby reducing the amount of refrigerant in the heat-source-side heat exchanger 4, the degree of superheat of the heat-source-side heat exchanger 4 is secured at or over the predetermined value. Specifically, when the rotation speed of the heat source air-sending device 5 is maximum and the degree of superheat of the heat-source-side heat exchanger 4 is lower than or equal to the predetermined value, the opening degree of the heat source pressure reducing mechanism 6 is controlled by the operation control part 103 so that the degree of superheat of the heat-source-side heat exchanger 4 is the predetermined value. By this control, heat in the heat-source-side heat exchanger 4 may be exhausted efficiently, and degradation of the operation efficiency can be avoided.

Further, in the refrigeration cycle apparatus 100, the refrigerant flowing through the indoor heat exchangers 10a and 10b and the refrigerant flowing through the heat-source-side heat exchanger 4 merge together and then the merged flow flows into the accumulator. When a liquid refrigerant is present in the accumulator, the degree of superheat at the inlet of the accumulator is zero in a steady state. Thus, when there is a degree of superheat at the heat-source-side heat exchanger 4, there is no degree of superheat at the indoor heat exchangers 10a and 10b. In contrast, when there is a degree of superheat at the indoor heat exchangers 10a and 10b, there is no degree of superheat at the heat-source-side heat exchanger 4. Therefore, it is possible to determine the presence or absence of a degree of superheat of the heat-source-side heat exchanger 4 without the temperature sensor 203. Specifically, when the degree of superheat is at or over a predetermined value, for example, 2 degrees Celsius or more, at both the indoor heat exchangers 10a and 10b, it is assumed that the degree of superheat of the heat-source-side heat exchanger 4 is zero, and therefore, the rotation speed of the heat source air-sending device 5 is controlled by the operation control part 103 so that the degree of superheat of any of the indoor heat exchangers 10a and 10b is lower than or equal to 2 degrees Celsius. The degree of superheat of the indoor heat exchangers 10a and 10b is a value obtained by subtracting a temperature detected by the temperature sensors 206a and 206b from a temperature detected by the temperature sensors 208a and 208b. Thus, the temperature sensors 208a, 208b, 206a, and 206b act as indoor degree-of-superheat detection means. When the rotation speed of the heat source air-sending device 5 is increased, the degree of superheat of the indoor heat exchangers 10a and 10b is decreased. In contrast, when the rotation speed of the heat source air-sending device 5 is decreased, the degree of superheat of the indoor heat exchangers 10a and 10b is increased.

In the case where the degree of superheat of both the indoor heat exchangers 10a and 10b is at or over the predetermined value, while the rotation speed of the heat source air-sending device 5 is maximum, an excessive amount of refrigerant flows to the heat-source-side heat exchanger 4. In such a case, by reducing the opening degree of the heat source pressure reducing mechanism 6 and thereby reducing the amount of the refrigerant in the heat-source-side heat exchanger 4, the degree of superheat of any one of the indoor heat exchangers 10a and 10b is decreased to a value lower than or equal to the predetermined value, so that the degree of superheat of the heat-source-side heat exchanger 4 is the predetermined value or more. Specifically, when the rotation speed of the heat source air-sending device 5 is maximum and the degree of superheat of the heat-source-side heat exchanger 4 is lower than or equal to the predetermined value, the opening degree of the heat source pressure reducing mechanism 6 is controlled by the operation control part 103 so that the degree of superheat of the heat-source-side heat exchanger 4 is the predetermined value. By this control, heat in the heat-source-side heat exchanger 4 is exhausted efficiently, and degradation of the operation efficiency can be avoided.

Figure 5:
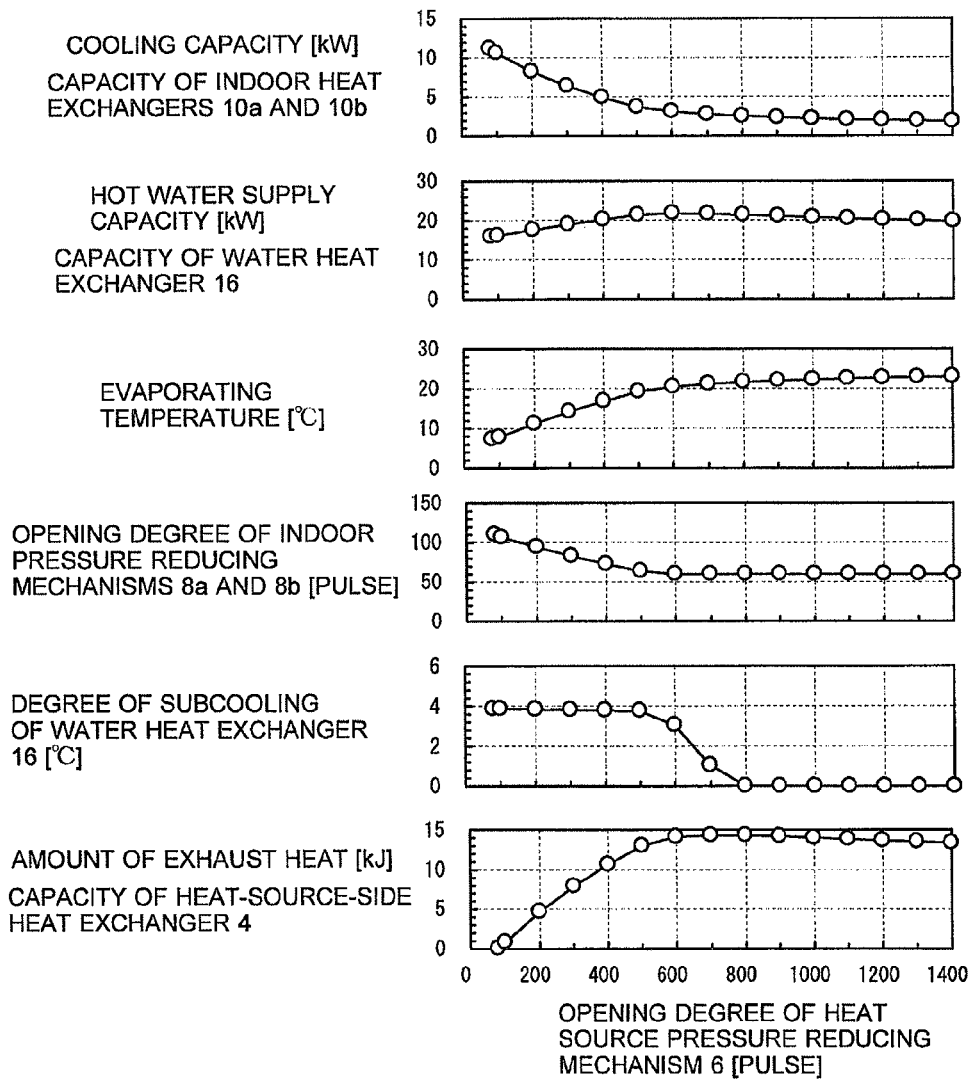
FIG. 5 includes diagrams illustrating changes of operation states with respect to the opening degree of the heat source pressure reducing mechanism 6 in the hot-water-supply-prioritized state of the refrigeration cycle apparatus 100 according to Embodiment 1.

FIG. 5 includes schematic diagrams illustrating changes of operation states with respect to the opening degree of the heat source pressure reducing mechanism 6 in the hot-water-supply-prioritized state. FIG. 5 uses the refrigeration cycle apparatus 100 of around 6 HP as an example. For simplicity, specifications of the indoor units 303a and 303b are the same and the cooling loads are also the same between the indoor units 303a and 303b. As illustrated in FIG. 5, as the opening degree of the heat source pressure reducing mechanism 6 increases, the cooling capacity decreases, and the amount of exhaust heat increases. Further, since the ratio of the quantity of heat treated by the heat-source-side heat exchanger 4 increases, the evaporating temperature rises and the hot water supply capacity also increases. However, when the opening degree of the heat source pressure reducing mechanism 6 is increased, the opening degrees of the indoor pressure reducing mechanisms 8a and 8b reach a lower limit, thus becoming incapable of further throttling the opening. Consequently, the degree of subcooling of the water heat exchanger 16 is decreased. The decrease in the degree of subcooling of the water heat exchanger 16 is not a desirable state as it degrades the operation efficiency. Further, when the opening degrees of the indoor pressure reducing mechanisms 8a and 8b are at the lower limit and further throttling is impossible, the flow rate of the refrigerant in the indoor heat exchangers 10a and 10b cannot be reduced even if the opening degree of the heat source pressure reducing mechanism 6 is increased. This prevents an effective distribution of the refrigerant, resulting in little change in the cooling capacity. From the above, it is necessary not to increase the opening degree of the heat source pressure reducing mechanism 6 to the extent where the degree of subcooling of the water heat exchanger 16 is not maintained at the target value. Specifically, when the opening degrees of both the indoor pressure reducing mechanisms 8a and 8b are at the lower limit, the heat source pressure reducing mechanism 6 is controlled by the operation control part 103 so that the degree of subcooling of the water heat exchanger 16 is the target value. Thus, it is possible to adjust the amount of exhaust heat without impairing operation efficiency excessively.

Since the opening degree of the heat source pressure reducing mechanism 6 is minimum in the air-conditioning-prioritized mode, when a selection is made and the control mode is switched from the air-conditioning-prioritized mode to the hot-water-supply-prioritized mode, it is necessary to set an appropriate initial opening degree so as not to impair the stability of the refrigeration cycle. As a method for setting an appropriate initial opening degree, the amount of exhaust heat treated by the heat-source-side heat exchanger 4 is estimated, based on the total capacity of the indoor units 303a and 303b which are in the cooling-ON state and the capacity of the hot water supply unit 304 which is in the hot-water-supply-ON state. Then, based on the ratio between the amount of exhaust heat treated by the heat-source-side heat exchanger 4 and the total capacity of the indoor units 303a and 303b which are in the cooling-ON state, and using the total opening degree of the indoor pressure reducing mechanisms 8a and 8b, a value can be obtained. Specifically, when it is assumed that the capacities of the indoor units 303a and 303b, which are in the cooling-ON state, are 3.5 kW and 2.5 kW, the capacity of the hot water supply unit 304 is 18 kW, the total opening degree at this time is 160 pulses (the opening degree of one of the indoor pressure reducing mechanisms 8a and 8b is within the range between 32 pulses and 480 pulses), and the total Cv value at this time is 0.034, the Cv value (capacity coefficient) required for the heat source pressure reducing mechanism 6 is $\{(18-3.5-2.5)/(3.5\pm2.5)\}\times0.034=0.068$. The opening degree of the heat source pressure reducing mechanism 6 can be obtained from the Cv value of the calculation result. Strictly speaking, the amount of exhaust heat decreases by the amount of input of the compressor. When this is taken into consideration, in the case where input of the compressor is 5 kW, the Cv value required for the heat source pressure reducing mechanism 6 is, therefore, $\{(18-3.5-2.5-5)/(3.5\pm2.5)\}\times0.034=0.040$. Unless the amount of input of the compressor is added to the amount of exhaust heat, an error occurs. However, an error at the setting of the initial opening degree can be fed back by regular control, and therefore, there would be no need to take it into account. The capacities of the indoor units 303a and 303b which are in the cooling-ON state and the hot water supply unit 304 which is in the hot-water-supply-ON state, are obtained by the communication part 104 of the controller 101.

When the control mode is the hot-water-supply-prioritized mode, the operation frequency of the compressor 1 is controlled to be fixed. The value that is controlled to be fixed may be set slightly lower than the maximum frequency, for example, at 75% of the maximum frequency, aiming at a higher operation efficiency. If the cooling load is large at this time, there is a possibility that a room is not cooled due to the short of cooling heat. Control corresponding to such a case will be described below. In the case where the control mode is the air-conditioning-prioritized mode, when the control mode is switched to the hot-water-supply-prioritized mode after the hot-water-supply-ON duration passes a predetermined time, if the current frequency of the compressor is higher than the frequency of the compressor set in the hot-water-supply-prioritized mode, the air-conditioning-prioritized mode is maintained. By this arrangement, the shortage of cooling heat caused by the switching to the hot-water-supply-prioritized mode can be avoided and a state in which the room is not cooled is prevented. Then, after the predetermined time passes and at the time when the current frequency of the compressor becomes lower than the frequency of the compressor set in the hot-water-supply-prioritized mode, the control mode is switched to the hot-water-supply-prioritized mode. Further, in the case where the control mode is the hot-water-supply-prioritized mode, when the opening degree of the heat source pressure reducing mechanism 6 reaches the lower limit, and the evaporating temperature is equal to or higher than the evaporating temperature target value even though there is little amount of exhaust heat, the operation frequency of the compressor 1 is increased so that the evaporating temperature is the evaporating temperature target value. By this arrangement, the shortage of cooling heat at the hot-water-supply-prioritized time can be avoided, and a state in which the room is not cooled is prevented. By performing the control as described above, the state in which the room is not cooled is prevented, even when the operation frequency of the compressor is not fixed to the maximum frequency at the hot-water-supply-prioritized time, because switching between control modes and control of the frequency of the compressor are performed in accordance with the magnitude of the cooling load when the cooling load is high. The lower limit of the opening degree of the heat source pressure reducing mechanism 6 mentioned here indicates a minimum value of the opening degree specified by normal operation control.

In general, in the indoor units 303a and 303b which are in the cooling-ON state, when the indoor air temperature becomes lower than the set temperature by a predetermined value or more, for example, 1.5 degrees Celsius or more, the indoor units 303a and 303b enter a cooling-thermo-OFF state. Thus, the opening degrees of the indoor pressure reducing mechanisms 8a and 8b reach the lower limit, so that a refrigerant does not flow to the indoor heat exchangers 10a and 10b. This prevents the room from being cooled further. After that, when the indoor air temperature becomes higher than the set temperature by a predetermined value or more, for example, 0.5 degrees Celsius or more, the indoor units 303a and 303b enter a cooling-thermo-ON state. Thus, the indoor pressure reducing mechanisms 8a and 8b are opened, so that a refrigerant flows to the indoor heat exchangers 10a and 10b. When both the indoor units 303a and 303b are in the cooling-thermo-OFF state in the cooling operation mode A, there is no room to be cooled, and the operation stops accordingly. In contrast, in the simultaneous cooling and hot water supply operation mode D, even if both the indoor units 303a and 303b are in the cooling-thermo-OFF state, the operation does not stop because of the hot water supply unit 304, and the mode is switched to the hot water supply operation mode C. In this action, in particular, when the simultaneous cooling and hot water supply operation mode D is switched to the hot water supply operation mode C at the time when the control mode is the air-conditioning-prioritized mode, the opening degree of the heat source pressure reducing mechanism 6 is changed from the state where the opening degree is fixed to the lower limit, and the operation frequency of the compressor 1 is fixed to a high frequency. This causes operations to shift greatly and operations become unstable. In order to stabilize an operation state, in the case of the simultaneous cooling and hot water supply operation mode D, the operation control part 103 of the controller 101 performs control so that the temperature for the cooling-thermo-OFF state is set lower than the temperatures in the cooling operation mode A by 1 degree Celsius or more, and the temperature for the cooling-thermo-ON state is set higher than the temperatures in the cooling operation mode A by 1 degree Celsius or more. That is, in the simultaneous cooling and hot water supply operation mode D, when the indoor air temperature becomes lower than the set temperature by 2.5 degrees Celsius or more, then the cooling-thermo-OFF state is entered, and after that, when the indoor air temperature becomes higher than the set temperature by 1.5 degrees Celsius or more, then the cooling-thermo-ON state is entered. By this arrangement, frequent switching between the simultaneous cooling and hot water supply operation mode D and the hot water supply operation mode C can be suppressed, ensuring a stable operation state. Therefore, the reliability of product quality can be improved.

Figure 6:
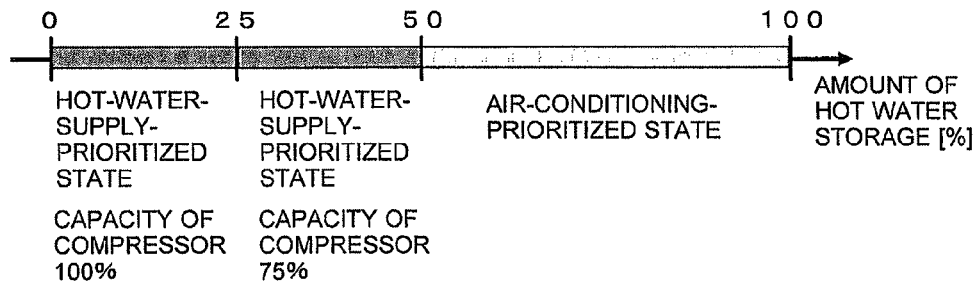
FIG. 6 is a diagram illustrating a determination method of the air-conditioning-prioritized state and the hot-water-supply-prioritized state based on the amount of hot water storage of the refrigeration cycle apparatus 100 according to Embodiment 1.

A selection between the air-conditioning-prioritized mode and the hot-water-supply-prioritized mode, which are control modes of the simultaneous cooling and hot water supply operation mode D, may use a duration, such as two hours, as an index, as described above. However, a method may be used in which the operation control part 103 makes a change based on the amount of hot water storage. FIG. 6 illustrates a case where a selection between the air-conditioning-prioritized mode and the hot-water-supply-prioritized mode is performed based on the amount of hot water storage. When the amount of hot water storage is between 100% and 50%, the amount of hot water is large, and there is little risk of running out of hot water. Therefore, an operation is performed in the air-conditioning-prioritized mode as a control mode. In contrast, when the amount of hot water storage is between 50% and 0%, the amount of hot water is small, and there is a risk of running out of hot water. Therefore, an operation is performed in the hot-water-supply-prioritized mode as a control mode. Since the amount of hot water is used as an index for determination, it is possible to assess the risk of running out of hot water with accuracy and to properly grasp an area of a small risk of running out of hot water. Thus, through an air-conditioning-prioritized mode, the operation efficiency is enhanced, and thereby energy saving can be achieved.

In the hot-water-supply-prioritized mode, the compressor is operated at a fixed operation frequency. The higher the fixed operation frequency at that time, the faster hot water is boiled. However, it is characterized by the fact that the operation efficiency is decreased. In order to enhance the operation efficiency as much as possible even in the hot-water-supply-prioritized mode, it is recommended to operate at an operation frequency as low as possible. As an index for the determination, the amount of hot water storage can be used. When the hot water storage amount is between 50% and 25%, it is determined that it will be a while before hot water runs out. Therefore, the compressor is set to operate at a fixed capacity of 75%. When the amount of hot water storage is between 25% and 0%, it is determined that there is a high risk of running out of hot water. Therefore, the compressor is set to operate at a capacity of 100%. This allows an operation efficiency kept as high as possible even in the hot-water-supply-prioritized mode. Further, since the amount of hot water storage is used as an index for determination, it is possible to assess the risk of running out of hot water with accuracy. This enhances the operation efficiency in the hot-water-supply-prioritized mode in an area of a small risk of running out of hot water. Thus, energy saving can be achieved. An operation efficiency of 100% means that, for example, when the maximum frequency of the compressor 1 is 100 Hz, the compressor 1 operates at 100 Hz. A compressor capacity of 75% means that the compressor operates at 75 Hz.

Thresholds of the air-conditioning-prioritized mode and the hot-water-supply-prioritized mode set on the basis of the amount of hot water storage as illustrated in FIG. 6 may be varied freely by a user. For example, through settings of the hot water supply remote controller 107 performed by a user, the amount of hot water storage for the air-conditioning-prioritized mode may be set to a range from 60% to 100%, and the amount of hot water storage for the hot-water-supply-prioritized mode may be set to a range from 0% to 60%. For a user who consumes a small amount of hot water, the amount of hot water storage for the air-conditioning-prioritized mode may be set to a range from 0% to 100%, and for a user who consumes a large amount of hot water, the amount of hot water storage for the hot-water-supply-prioritized mode may be set to a range from 0% to 100%. Thus, it is possible to use a prioritized operation selectively in accordance with user's consumption amount of hot water. This secures tolerance to running out of hot water while increasing energy saving.

Further, the operation capacity of the compressor at the hot-water-supply-prioritized time (a relation amount of switching of the hot-water-supply-prioritized operation) may set by a user using the hot water supply remote controller 107. For example, when the amount of hot water storage for the hot-water-supply-prioritized mode is set to a range from 0% to 60%, the compressor may be configured to operate at a capacity of 90% when the amount of hot water storage is within a range from 0% to 40%, and the compressor may be configured to operate at a capacity of 70% when the amount of hot water storage is within a range from 40% to 60%. By this arrangement, it is possible to achieve, for example, hot water supply at high operation efficiency in accordance with user's hot water usage, allowing further enhancement of energy-saving performance.

If the capacity of the compressor, a threshold of a control mode, or the like, is displayed as it is on the hot water supply remote controller 107, it is highly likely that a user does not understand it. As a display method, indexes of thresholds for the hot-water-supply-prioritized mode and the air-conditioning-prioritized mode may be displayed as rapid hot water supply, normal hot water supply, and mild hot water supply (a relation amount of switching of a priority threshold). In such a case, in the case of the rapid hot water supply, for example, the amount of hot water storage is set to a range from 0% to 75% for the hot-water-supply-prioritized mode and to a range from 75% to 100% for the air-conditioning-prioritized mode. In the case of the normal hot water supply, for example, the amount of hot water storage is set to a range from 0% to 50% for the hot-water-supply-prioritized mode and to a range from 50% to 100% for the air-conditioning-prioritized mode. In the case of the mild hot water supply, for example, the amount of hot water storage is set to a range from 0% to 25% for the hot-water-supply-prioritized mode and to a range from 25% to 100% for the air-conditioning-prioritized mode. Further, indexes of the capacity of the compressor at the hot-water-supply-prioritized time may be displayed as large capacity, normal, and energy-saving (a relation amount of switching of the hot-water-supply-prioritized operation). In such a case, for example, the capacity of the compressor may be set to 100% for large capacity, the capacity of the compressor may be set to 80% for normal, and the capacity of the compressor may be set to 60% for energy saving. Furthermore, a threshold for selecting and switching the capacity of the compressor in the hot-water-supply-prioritized mode may be set in the middle of the hot-water-supply-prioritized range, and a capacity of the compressor may be specified for each portion. Alternatively, the same capacity of the compressor may be specified for the entire hot-water-supply-prioritized range. The relation amount of switching of a priority threshold and the relation amount of switching of a hot-water-supply-prioritized operation are displayed on the display part 109 of the hot water supply remote controller 107, and may be input through the input part 110 by a user.

[Second Simultaneous Cooling and Hot Water Supply Operation Mode E]

Next, a second simultaneous cooling and hot water supply operation mode E in which cooling heat is supplied to the indoor units 303a and 303b having a cooling load and hot water heat is supplied to the hot water unit 304 having no hot water supply demand (second hot water supply operation), will be explained.

In the actual operation, a state in which the amount of hot water storage in the hot water storage tank 19 is about 70% by consumption of hot water by a user even when there is a cooling load and there is no hot water supply demand, occurs. On the assumption that hot water is used daily, it is considered that even if there is no hot water supply demand, selecting a simultaneous cooling and hot water supply operation having a high operation efficiency and using hot water supply heat allows greater energy saving in total. When cooling is performed in a state in which the amount of hot water storage is large enough with respect to a hot water load, both the cooling operation mode A and the second simultaneous cooling and hot water supply operation mode E are able to be executed. A control method of equipment and the flow direction of a refrigerant in the second simultaneous cooling and hot water supply operation mode D are the same as those in the simultaneous cooling and hot water supply operation mode D. There are differences between the simultaneous cooling and hot water supply operation mode D and the second simultaneous cooling and hot water supply operation mode E in that the simultaneous cooling and hot water supply operation mode D has an air-conditioning-prioritized mode and a hot-water-supply-prioritized mode as control modes, whereas the second simultaneous cooling and hot water supply operation mode E has only an air-conditioning-prioritized mode as a control mode. An air-conditioning-prioritized control method in the second simultaneous cooling and hot water supply operation mode E is the same as that in the simultaneous cooling and hot water supply operation mode D. Although there is no hot water supply demand in the hot water supply unit in the second simultaneous cooling and hot water supply operation mode E, the water pump 17 is operated.

On the assumption of the second simultaneous cooling and hot water supply operation mode E, an operation utilizing two simultaneous cooling and hot water supply operation modes can be performed as described below. First, a cooling load is generated when the amount of hot water storage is not 100%, for example, about 70%, and cooling ON is set by the air-conditioning remote controllers 108a and 108b, cooling and hot water supply are performed simultaneously as the second simultaneous cooling and hot water supply operation mode E. At this time, since a hot water supply operation with no hot water supply demand is performed, an air-conditioning-prioritized mode is set as a control mode. In contrast, when the cooling-ON state is entered in a state in which there is a hot water supply demand, cooling and hot water supply are performed simultaneously as the simultaneous cooling and hot water supply operation mode D, and the hot-water-supply-prioritized mode is set as a control mode. Thus, hot water supply is performed with high operation efficiency when there is no hot water supply demand and there is no worry about running out of hot water. An operation which is tolerant to running out of hot water is performed while hot water supply is demanded when there is worry about running out of hot water, thus achieving energy saving in a state where there is no worry about running out of hot water. Obviously, an aspect in which the capacity of the compressor at the time when hot water supply is prioritized varies according to the amount of hot water storage may be added to this case.

Accordingly, high operation efficiency can be achieved even when hot water supply is prioritized, thus achieving energy saving.

Figure 7:
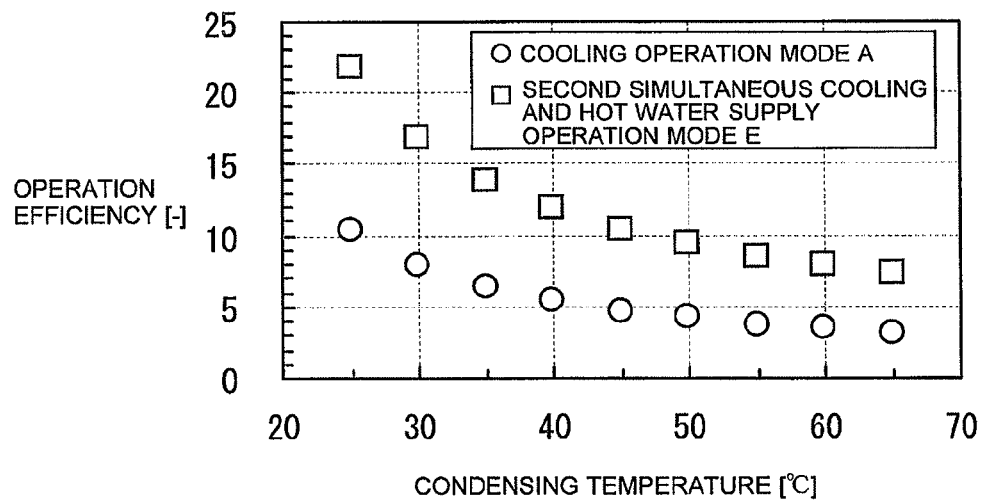
FIG. 7 is a diagram illustrating a change of the operation efficiency with respect to the condensing temperature in a cooling operation mode A and a second simultaneous cooling and hot water supply operation mode E of the refrigeration cycle apparatus 100 according to Embodiment 1.

The case where a simultaneous cooling and hot water supply operation is performed when a cooling load is generated even if there is no hot water supply demand, has been described above. However, the second simultaneous cooling and hot water supply operation mode E does not always achieve an efficiency higher than the cooling operation mode A. Depending on the hot water discharge temperature, outside air temperature, or cooling load, the cooling operation mode A may achieve an efficiency higher than the second simultaneous cooling and hot water supply operation mode E. FIG. 7 illustrates a change in the operation efficiency with respect to the condensing temperature in the cooling operation mode A and the second simultaneous cooling and hot water supply operation mode E (the air-conditioning-prioritized mode is set as a control mode). In the second simultaneous cooling and hot water supply operation mode E, since exhausted hot water supply heat is recovered, high operation efficiency may be basically achieved. However, at a high condensing temperature, such as 50 degrees Celsius or 55 degrees Celsius, the operation efficiency is lower than that at a condensing temperature of 25 degrees Celsius or 30 degrees Celsius in the cooling operation mode A. That is, when the hot water discharge temperature is high, such as 50 degrees Celsius or 55 degrees Celsius, and the condensing temperature is high, such as 50 degrees Celsius or 55 degrees Celsius, if the outside air temperature is low or the cooling load is low, the cooling operation mode A, in which the condensing temperature is 25 degrees Celsius or 30 degrees Celsius, achieves an operation efficiency higher than the second simultaneous cooling and hot water supply operation mode E.

Figure 8:
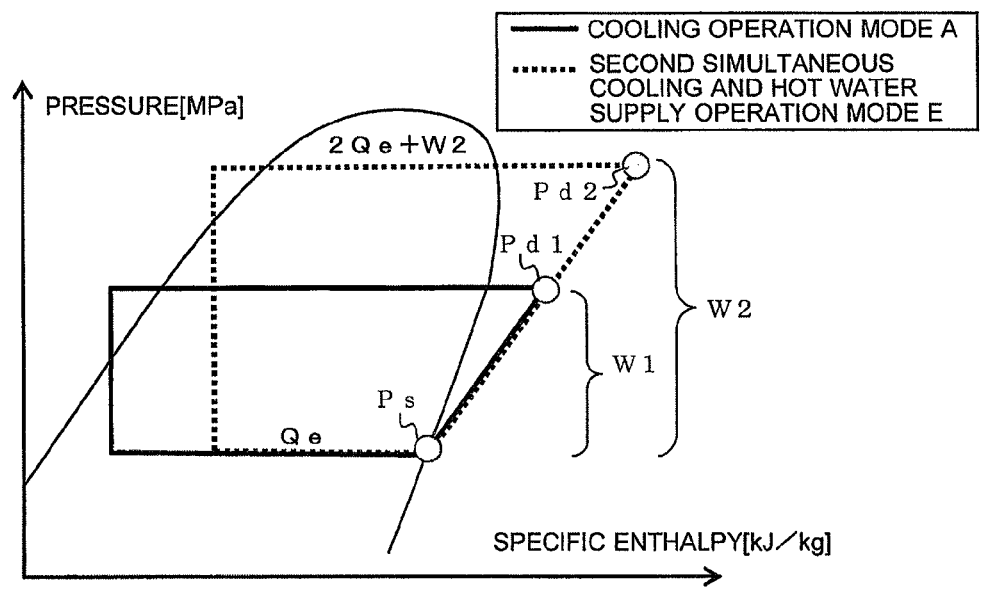
FIG. 8 is a diagram illustrating a Mollier chart in the cooling operation mode A and the second simultaneous cooling and hot water supply operation mode E of the refrigeration cycle apparatus 100 according to Embodiment 1.

Specific conditions under which the cooling operation mode A achieves an operation efficiency higher than the second simultaneous cooling and hot water supply operation mode E will be described below. FIG. 8 is a Mollier chart in the cooling operation mode A and the second simultaneous cooling and hot water supply operation mode E. The hot water supply heat in the second simultaneous cooling and hot water supply operation mode E is represented by $Qe+Qe+W2=2Qe+W2$, where Qe [kW] represents the cooling load, W1 [kW] represents the compressor input in the cooling operation mode A, and W2 [kW] represents the compressor input in the second simultaneous cooling and hot water supply operation mode E. Thus, the cooling operation mode A achieves an operation efficiency higher than the second simultaneous cooling and hot water supply operation mode E when the following conditions are satisfied.

$$Qe/W1 \geq (2Qe+W2)/W2 \qquad \text{(Math. 1)}$$

The operation efficiency in the cooling operation mode A is represented by $COPc=Qe/W1$, and the following expression may thus be derived.

$$W2/W1 \geq (2COPc)/(COPc-1) \qquad \text{(Math. 2)}$$

On the assumption that the compressor input is in proportion to the compression ratio (high pressure/low pressure), when high pressure in the cooling operation mode A is represented by Pd1 [MPa] and high pressure in the second simultaneous cooling and hot water supply operation mode E is represented by Pd2 [MPa], the indoor heat exchangers 10a and 10b operate as evaporators both in the cooling operation mode A and the second simultaneous cooling and hot water supply operation mode E, and the indoor temperature does not change. Therefore, if low pressure in each of the cooling operation mode A and the second simultaneous cooling and hot water supply operation mode E is represented by Ps [MPa] before and after switching, the following expression may be derived.

$$(Pd2-Ps)/(Pd1-Ps)(2COPc)/(COPc-1) \quad \text{(Math. 3)}$$

When a calculation of COPc is performed for the right side, when COPc is 5 or more, the right side becomes 2.5 or less. On the assumption that the cooling operation mode A achieves an operation efficiency higher than the second simultaneous cooling and hot water supply operation mode E when the outside air temperature is low or when the cooling load is low, that is, for example, mostly when COPc is 5 or more, a determination as to switching may be made based on whether or not the compression ratio is 2.5 times or more. Furthermore, since low pressure does not change between before and after switching, the determination as to selection of an operation and switching between operations may be made only based on changes in the high pressures Pd1 and Pd2. That is, the determination as to switching between operation modes may be made according to the ratio of high pressure in the second simultaneous cooling and hot water supply operation mode E to high pressure in the cooling operation mode A.

Figure 9:
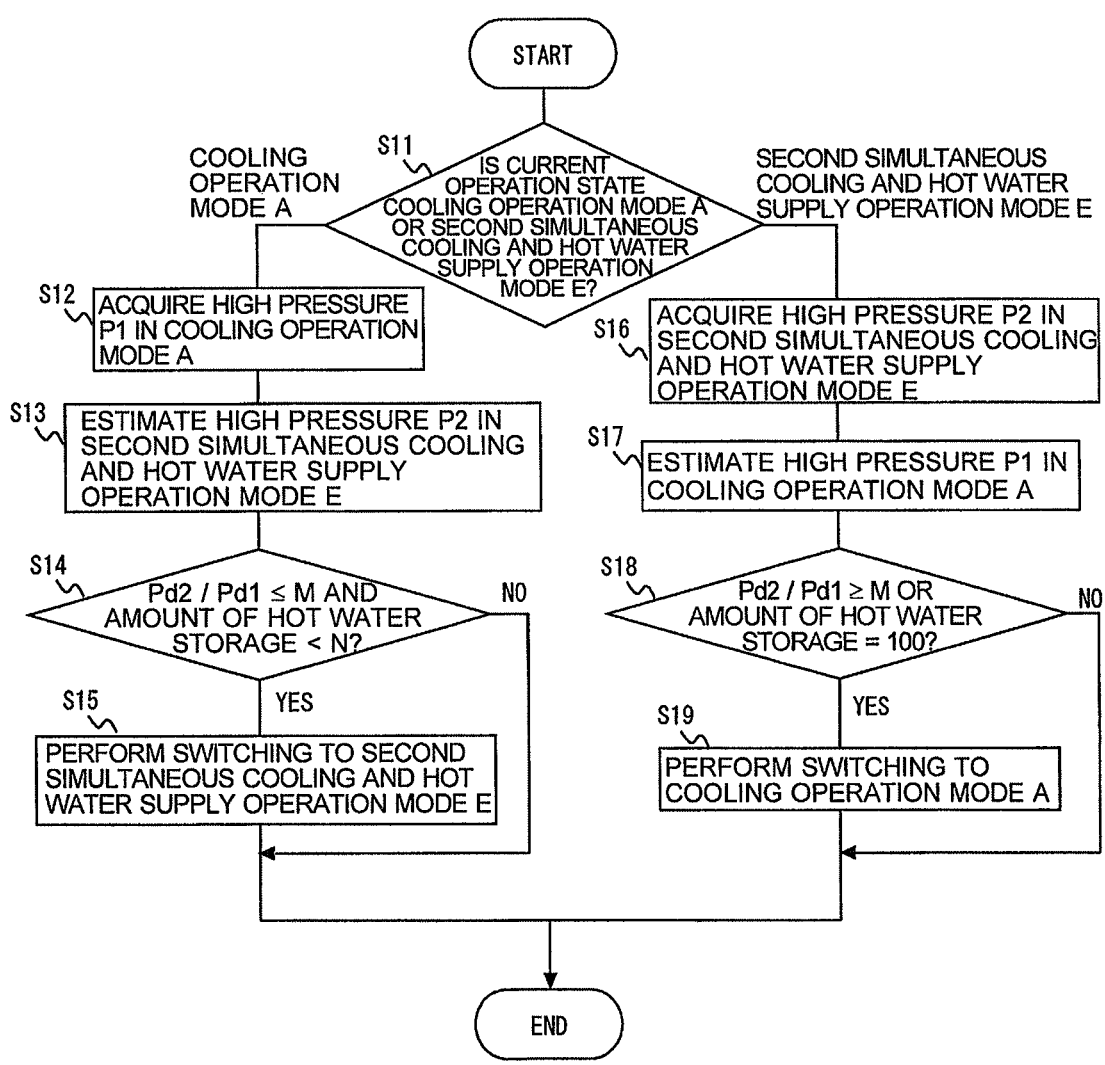
FIG. 9 is a flowchart illustrating selection of an operation mode in the case where there is a cooling load but no hot water supply demand and the amount of heat storage in a hot water storage tank 19 is not maximum in the refrigeration cycle apparatus 100 according to Embodiment 1.

FIG. 9 is a flowchart illustrating a case where an operation mode is selected and switching between operation modes is performed when there is a cooling load and there is no hot water supply demand. An operation illustrated in FIG. 9 is performed by the additional exhaust heat recovery determination part 106 of the controller 101. Switching between operation modes in the case where there is no hot water supply demand will be explained below with reference to FIG. 9. First, in step S11, a determination as to the current operation status is made. In the case of the cooling operation mode A, high pressure P1 is acquired in step S12. The high pressure P1 is high pressure in the cooling operation mode A that is currently being operated and is the pressure detected by the pressure sensor 201. Then, high pressure P2 is estimated in step S13. The high pressure P2 in the case of the second simultaneous cooling and hot water supply operation mode E is estimated as described below. That is, the hot water storage tank 19 employs a boiling method based on circulation and heating, and a heat medium flowing into the water heat exchanger 16 circulates through the water-side circuit 18 while increasing the temperature thereof by a predetermined temperature. That is, the outlet water temperature of the water heat exchanger 16 is equal to the temperature obtained by adding the predetermined temperature to the inlet water temperature, such as, for example, the temperature obtained by adding 5 degrees Celsius to the inlet water temperature. When the water heat exchanger 16 operates as a condenser, the condensing temperature of the high pressure Pd2 is usually substantially equal to the heat medium temperature of the outlet of the water heat exchanger. Therefore, the condensing temperature of the high pressure Pd2 may be set to the temperature obtained by adding 5 degrees Celsius to the inlet water temperature of the water heat exchanger 16. The inlet water temperature of the water heat exchanger 16 is the temperature at the lowest portion of temperature sensors which detect the water temperature of the hot water storage tank 19, that is, the temperature detected by the temperature sensor 211d in Embodiment 1. In the case where the temperature sensors 211a to 211d are not provided, the inlet water temperature may be fixed as the value of the temperature of normal water, for example, 15 degrees Celsius. A temperature sensor may be provided between the water pump 17 and the water heat exchanger 16, and the temperature detected by the temperature sensor may be defined as the inlet water temperature. The high pressure P2 is calculated from the obtained condensing temperature. The additional exhaust heat recovery determination part 106 includes second cooling and hot water supply high pressure estimation means for calculating the high pressure P2 as described above. Then, in step S14, it is determined whether or not Pd2/Pd1 is smaller than or equal to a high pressure determination threshold M [-]. When Pd2/Pd1 is smaller than or equal to the high pressure determination threshold M and the amount of hot water storage is smaller than a hot water storage amount determination threshold N, switching to the second simultaneous cooling and hot water supply operation mode E is performed in step S15. Based on results of the discussion above, 2.5 is obtained as M. In addition, N represents a threshold which permits the second simultaneous cooling and hot water supply operation mode E in which there is no hot water supply demand, and is set to, for example, 70. Furthermore, when Pd2/Pd1 is equal to or greater than M or the amount of hot water storage is greater than N, the cooling operation mode A is maintained.

When it is determined in step S11 that the current operation status is the second simultaneous cooling and hot water supply operation mode E, the process proceeds to step S16. The current operation status is determined to be the second simultaneous cooling and hot water supply operation mode E in step S11 when switching to the second simultaneous cooling and hot water supply operation mode E is performed in step S15 and the determination in step S11 is then made. In step S16, the high pressure P2 is obtained. The high pressure P2 represents the second simultaneous cooling and hot water supply operation mode E that is currently being operated and the pressure detected by the pressure sensor 201. Next, in step S17, high pressure P1 is estimated. The high pressure P1 in the case of the cooling operation mode A is estimated as described below. That is, the condensing temperature in the cooling operation mode A is obtained by adding a predetermined temperature to the outside air temperature. It is considered that switching to the second simultaneous cooling and hot water supply operation mode E in the processing of steps S12 to S15 is mainly performed when the cooling load is low. In such a case, the predetermined temperature is about 5 degrees Celsius. That is, the pressure in the case where the condensing temperature is represented by a temperature obtained by adding 5 degrees Celsius to the outside air temperature is defined as the high pressure P1. The outside air temperature is the temperature detected by the temperature sensor 204. Since the condensing temperature is abnormally low when the outside air temperature is low, the condensing temperature is fixed at, for example, 25 degrees Celsius when the temperature obtained by adding 5 degrees Celsius to the outside air temperature is 25 degrees Celsius or below. The high pressure P1 is calculated from the obtained condensing temperature. The additional exhaust heat recovery determination part 106 includes cooling high pressure estimation means for calculating the high pressure P1 as described above. Then, in step S18, it is determined whether or not Pd2/Pd1 is equal to or greater than the high pressure determination threshold M. When Pd2/Pd1 is equal to or greater than M, switching to the cooling operation mode A is performed in step S19. When Pd2/Pd1 is smaller than or equal to M, the second simultaneous cooling and hot water supply operation mode E is maintained. Furthermore, since no more hot water may be stored when the amount of hot water storage has reached 100, switching to the cooling operation mode A is performed. The flowchart illustrated in FIG. 9 is performed with predetermined time intervals, such as, for example, five minutes.

Although the high pressure determination threshold M is set to "2.5" in the above explanation, the high pressure determination threshold M is not necessarily set to "2.5". The high pressure determination threshold M may be set to "2" or "3". The operation in the cooling operation mode A is more likely to be selected as the high pressure determination threshold M decreases, and the operation of the second simultaneous cooling and hot water supply operation mode E is more likely to be selected as the high pressure determination threshold M increases. Furthermore, in setting an estimation value of the high pressure P1 in step S17, the operation state in the cooling operation mode A before switching may be used. More specifically, when the determination in step S14 is YES, the current predetermined temperature is stored as a temperature difference between the condensing temperature and the outside air temperature and is used as the predetermined temperature to be used for the calculation in step S17. The condensing temperature is the saturation temperature of the pressure detected by the high pressure sensor 201, and the outside air temperature is the temperature detected by the temperature sensor 204. Furthermore, in order to prevent hunting in switching between operation modes, when switching between operation modes is performed, that is, step S15 or step S19 is performed, the flowchart illustrated in FIG. 9 may not be performed for 30 minutes.

As described above, with the use of the high pressure in the current operation status and the high pressure estimated from the outside air temperature or water temperature, a determination as to whether the cooling operation mode A or the second simultaneous cooling and hot water supply operation mode E achieves a higher operation efficiency may be performed properly, and an operation with higher efficiency may be performed. Therefore, cooling heat and hot water supply heat may be achieved with high operation efficiency, and energy saving may thus be achieved.

The hot water storage amount threshold for the hot water storage tank 19 for the flowchart illustrated in FIG. 9 may be set to 70%, and a user may change the amount of hot water storage to, for example, 60% or 80%, using the hot water supply remote controller 107. By using a large hot water storage amount threshold, hot water may be obtained with high operation frequency. Therefore, energy saving may be achieved. Furthermore, by setting a small hot water storage amount threshold, excess water boiling may be prevented. As described above, by allowing a user to perform setting, the quantity of heat may be managed in accordance with the style of hot water usage by the user. Therefore, the amount of boiling water is optimized, and unnecessary additional boiling may be avoided or hot water may be obtained by a high-efficiency operation. Thus, energy saving is achieved. Furthermore, the method for inputting the hot water storage amount threshold by a user is not necessarily performed by designating percentage. The hot water storage amount threshold may be designated by a user-friendly way, such as designation of a large amount (80%), a medium amount (60%), or a small amount (40%).

In Embodiment 1, the hot water supply unit 304 employs a boiling method based on circulation and heating. Therefore, it is estimated that the operation described below is performed when the flowchart illustrated in FIG. 9 is performed. Low-temperature tap water is present in a lower part of the hot water storage tank 19, and it is determined in step S13 that the high pressure P2 is a pressure at a condensing temperature, which is obtained by adding 5 degrees Celsius to tap water. Therefore, when the amount of hot water storage is below N, even if the outside air temperature is low or the cooling load is low, switching to the second simultaneous cooling and hot water supply operation mode E is performed almost certainly. Then, after the operation is performed for a while, when the water temperature at the bottom of the tank is increased a plurality of times, the condensing temperature increases. Then, if the outside air temperature is low or the cooling load is low, the cooling operation mode A is selected again in step S18. The operation is maintained by switching in step S19.

Embodiment 2

Differences from Embodiment 1

Figure 10:
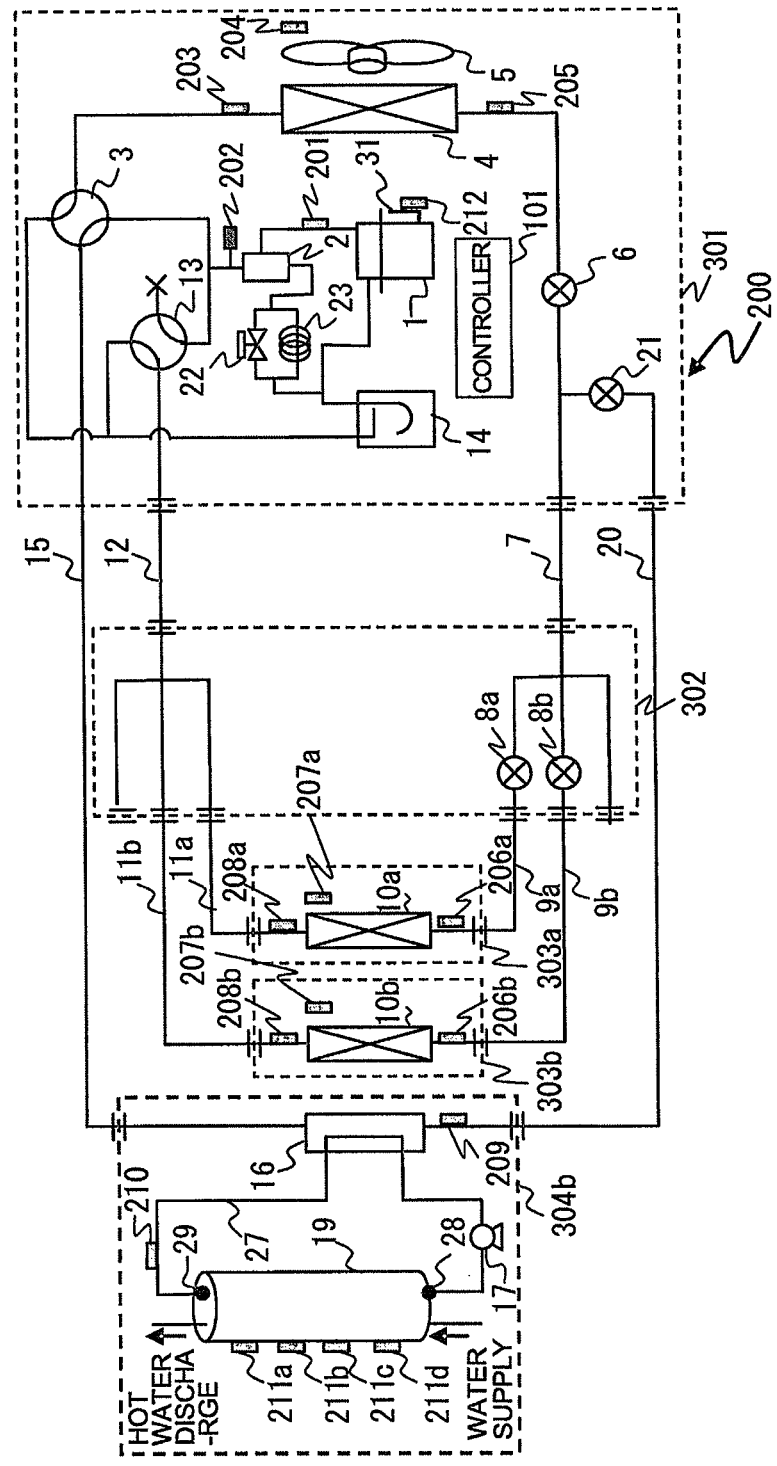
FIG. 10 is a refrigerant circuit diagram of a refrigeration cycle apparatus 200 according to Embodiment 2.

FIG. 10 is a refrigerant circuit diagram of a refrigeration cycle apparatus 200 according to Embodiment 2 of the present invention. The refrigerant circuit configuration of the refrigeration cycle apparatus 200 will be explained with reference to FIG. 10. The same parts as those in Embodiment 1 will be referred to with the same reference signs and differences from Embodiment 1 will be mainly explained. In the refrigeration cycle apparatus 200 according to Embodiment 2, a hot water supply unit 304b is connected, in place of the hot water supply unit 304.

<Hot Water Supply Unit 304b>

The hot water supply unit 304b includes the plate water heat exchanger 16, the water-side circuit 27, the water pump 17, and the hot water storage tank 19. The water-side circuit 27 allows connection between the water heat exchanger 16 and the hot water storage tank 19, and water of the hot water storage tank 19 circulates through the water-side circuit 27. The water pump 17 has a function of causing water in the hot water storage tank 19 to circulate through the water-side circuit 27 and is configured to be capable of varying the flow rate of water supplied to the water heat exchanger 16. The hot water storage tank 19 is of a full water type. Hot water is discharged from the top of the tank according to a hot water supply demand on the load side, and low-temperature tap water corresponding to the decreased amount of hot water is supplied from the bottom of the tank.

The water pump 17 sends water in the hot water storage tank 19 through the connection point 28 at the bottom of the tank. The water then passes through the water pump 17 and is heated by a refrigerant in the water heat exchanger 16, thus increasing the temperature thereof. Then, the heated water passes through the connection point 29 at the top of the tank and flows into the hot water storage tank 19. In accordance with this process, water is boiled in the hot water storage tank 19.

Hot water is discharged out of the top of the hot water storage tank 19, and low-temperature tap water is supplied through the bottom of the hot water storage tank 19. Therefore, low-temperature water is present in a lower part of the tank. Regarding the hot water storage tank 19 and the water-side circuit 27, water flows out through the connection point 28 at the bottom of the tank and water flows in through the connection point 29 at the top of the tank. Therefore, if the temperature of water flowing in does not exceed a hot water discharge temperature, the temperature of water in an upper part of the tank decreases. Thus, unlike Embodiment 1, water needs to be increased to a set hot water discharge temperature by a single heat exchange operation at the water heat exchanger 16. This boiling method is called once-through heating. Since boiling is achieved by a single heat exchange operation in Embodiment 2, the flow rate of the water pump 17 is lower than Embodiment 1. For example, if the set hot water discharge temperature is 55 degrees Celsius and the temperature of water in a lower part of the hot water storage tank 19 is 15 degrees Celsius, the inlet water temperature of the water heat exchanger 16 in the water-side circuit 27 is 15 degrees Celsius and the outlet water temperature of the water heat exchanger 16 in the water-side circuit 27 is 55 degrees Celsius.

The operation modes used in Embodiment 2 are the cooling operation mode A, the heating operation mode B, the hot water supply operation mode C, the simultaneous cooling and hot water supply operation mode D, and the second simultaneous cooling and hot water supply operation mode E, as in Embodiment 1. Furthermore, control methods of equipment in the individual operation modes are similar to Embodiment 1 with the exception described below. That is, since, unlike Embodiment 1, boiling is performed by a once-through heating in the hot water supply unit 304b in Embodiment 2, an operation method in execution of the flowchart illustrated in FIG. 9 differs between Embodiment 1 and Embodiment 2. More specifically, a method for estimating the high pressure P2 in the second simultaneous cooling and hot water supply operation mode E in step S13 differs between Embodiment 1 and Embodiment 2. This difference will be explained below.

The flowchart of FIG. 9 illustrates selection of an operation mode when there is a cooling load and there is no hot water supply demand. The process illustrated in FIG. 9 is executed by the additional exhaust heat recovery determination part 106 of the controller 101. First, in step S11, a determination as to the current operation status is performed. In the case of the cooling operation mode A, the high pressure P1 is acquired in step S12. The high pressure P1 is high pressure in the cooling operation mode A that is currently being operated and is the pressure detected by the pressure sensor 201. Then, in step S13, the high pressure P2 is estimated. The high pressure P2 in the case of the second simultaneous cooling and hot water supply operation mode E is estimated as described below. More specifically, the boiling method for the hot water storage tank 19 is based on once-off heating, and water flowing into the water heat exchanger 16 reaches the hot water discharge temperature at the outlet of the water heat exchanger 16. For example, when the set hot water discharge temperature is 55 degrees Celsius, the temperature of water at the outlet of the water heat exchanger 16 is also 55 degrees Celsius. In the case where the water heat exchanger 16 operates as a condenser, since the condensing temperature of the high pressure Pd2 is normally substantially equal to the water temperature at the outlet of the water heat exchanger, the condensing temperature of the high pressure Pd2 may be defined as the hot water discharge temperature. The high pressure P2 is calculated based on the obtained condensing temperature. The additional exhaust heat recovery determination part 106 includes second cooling and hot water supply high pressure estimation means for calculating the high pressure P2 described above. Then, in step S14, it is determined whether or not Pd2/Pd1 is smaller than or equal to a high pressure determination threshold M [-]. When Pd2/Pd1 is smaller than or equal to M and the amount of hot water storage is smaller than a hot water storage amount determination threshold N, switching to the second simultaneous cooling and hot water supply operation mode E is performed in step S15. Based on results of the discussion above, 2.5 is obtained as the high pressure determination threshold M. The hot water storage amount determination threshold N is a threshold which permits the second simultaneous cooling and hot water supply operation mode E in the case where there is no hot water supply demand, and is set to, for example, 70. When Pd2/Pd1 is equal to or greater than M and the amount of hot water storage is greater than N, the cooling operation mode A is maintained.

When it is determined in step S11 that the operation mode is the second simultaneous cooling and hot water supply operation mode E, the process proceeds to step S16. For example, when the flow illustrated in FIG. 9 is executed after switching to the second simultaneous cooling and hot water supply operation mode E in step S15, the process proceeds to step S16. The processing of steps S16 to S19 are similar to those in Embodiment 1. As described above, the processing method in step S13 varies according to the boiling method. However, with the use of high pressure in the current operation status and the high pressure estimated from the outside air temperature or the water temperature, a determination as to whether the cooling operation mode A or the second simultaneous cooling and hot water supply operation mode E achieves higher operation efficiency may be made appropriately, and an operation with high efficiency may be performed. Therefore, cooling heat and hot water supply heat may be achieved with high operation frequency, thus achieving energy saving.

In the second embodiment, since the hot water supply unit 304b employs the boiling method based on once-through heating, the operation described below is estimated to be performed when the process illustrated by the flowchart of FIG. 9 is performed. It is determined in step S13 that the high pressure P 2 is a pressure at which the condensing temperature is equal to the hot water discharge temperature. Therefore, when the condensing temperature in the cooling operation mode A is low due to a low outside air temperature, a low cooling load, or the like, the second simultaneous cooling and hot water supply operation mode E is not selected. In contrast, when the outside air temperature is high or the cooling load is high, the second simultaneous cooling and hot water supply operation mode E is selected, and an operation continues to be performed until the amount of hot water storage has reached 100%.

The invention claimed is:

1. A refrigeration cycle apparatus comprising:
a heat source unit including a compressor whose operation frequency is controllable;
a hot water supply unit including a water-side circuit configured by connecting, by a pipe, a hot water storage tank, and a water heat exchanger that heats water within the hot water storage tank;
an indoor unit connecting by a pipe to the heat source unit in parallel with the hot water supply unit; and
a controller including an operation control part that controls operations of individual units, wherein
the operation control part
includes a simultaneous cooling and hot water supply operation mode, in which a cooling operation mode in which a refrigerant from the compressor is caused to flow to the indoor unit having a cooling load, and a hot water supply operation mode in which the refrigerant from the compressor is caused to flow to the hot water supply unit having a hot water supply demand, are performed simultaneously,
includes, as control modes of the simultaneous cooling and hot water supply operation mode, a cooling-prioritized mode in which the operation frequency of the compressor is controlled according to the cooling load and a hot-water-supply-prioritized mode in which the operation frequency of the compressor is controlled according to the hot water supply demand, and switches the control mode of the simultaneous cooling and hot water supply operation mode between the cooling-prioritized mode and the hot-water-supply-prioritized mode, according to a relationship between the cooling load and the hot water supply demand.

2. The refrigeration cycle apparatus of claim 1, wherein the controller further includes a hot water storage amount calculation part configured to calculate an amount of hot water storage in the hot water storage tank, and the operation control part further selects between the cooling-prioritized mode and the hot-water-supply-prioritized mode, which are control modes of the simultaneous cooling and hot water supply operation mode, according to the amount of hot water storage, and selects a fixed amount of the operation frequency of the compressor when the hot-water-supply-prioritized mode is selected.

3. The refrigeration cycle apparatus of claim 1, further comprising a heat source pressure reducing mechanism configured to control the flow rate of the refrigerant flowing through the heat source unit, wherein in a case where the control mode of the simultaneous cooling and hot water supply operation mode is the cooling-prioritized mode, when the operation frequency of the compressor is higher than a target frequency in the hot-water-supply-prioritized mode, the operation control part enters the cooling-prioritized mode, and in a case where the control mode is the hot-water-supply-prioritized mode, when the opening degree of the heat source pressure reducing mechanism is a lower limit and an evaporating temperature is equal to or higher than a target evaporating temperature, the operation control part controls the operation frequency of the compressor so that the evaporating temperature is the target evaporating temperature.

4. The refrigeration cycle apparatus of claim 3, further comprising:

indoor temperature measuring means for measuring an air temperature at an installation place of the indoor unit;

an indoor pressure reducing mechanism configured to control the flow rate of the refrigerant flowing through the indoor unit; and evaporating temperature detection means for detecting an evaporating temperature between the indoor pressure reducing mechanism and the compressor, wherein the operation control part further controls, in the hot-water-supply-prioritized mode of the simultaneous cooling and hot water supply operation mode, the opening degree of the heat source pressure reducing mechanism so that the evaporating temperature is the target evaporating temperature, and sets the target evaporating temperature in accordance with a maximum temperature difference between the indoor temperature and a set temperature of the indoor unit.

5. The refrigeration cycle apparatus of claim 4, further comprising:

a heat radiation plate that rejects heat generated from an electronic substrate provided within the heat source unit; heat radiation plate temperature detection means for detecting a temperature of the heat radiation plate; and heat-source-side degree-of-superheat detection means for detecting a degree of superheat of a heat-source-side heat exchanger disposed in the heat source unit or indoor degree-of-superheat detection means for detecting a degree of superheat of an indoor heat exchanger disposed in the indoor unit, wherein the operation control part further controls, in the cooling-prioritized mode of the simultaneous cooling and hot water supply operation mode, a rotation speed of a heat source air-sending device which supplies outside air to the heat-source-side heat exchanger so that the heat radiation plate temperature is lower than or equal to a heat radiation plate target temperature, which is a temperature at which the electronic substrate is not damaged, and controls, in the hot-water-supply-prioritized mode of the simultaneous cooling and hot water supply operation mode, the rotation speed of the heat source air-sending device so that the heat radiation plate temperature is lower than or equal to the heat radiation plate target temperature and any one of a state in which the heat-source-side degree of superheat is equal to or greater than a predetermined value and a state in which the indoor degree of superheat is smaller than or equal to a predetermined value is attained.

6. The refrigeration cycle apparatus of claim 5, wherein in a case where a rotation speed of the heat source air-sending device is maximum in the hot-water-supply-prioritized mode of the simultaneous cooling and hot water supply operation mode, the operation control part further controls, when a degree of superheat of the heat-source-side heat exchanger is smaller than or equal to a predetermined value, the opening degree of the heat source pressure reducing mechanism so that the degree of superheat of the heat-source-side heat exchanger is the predetermined value, or when the degree of superheat of the indoor heat exchanger is equal to or greater than the predetermined value, the opening degree of the heat source pressure reducing mechanism so that the degree of superheat of the indoor heat exchanger is smaller than or equal to the predetermined value.

7. The refrigeration cycle apparatus of claim 4, further comprising degree-of-subcooling detection means for detecting a degree of subcooling of the water heat exchanger, wherein in the hot-water-supply-prioritized mode of the simultaneous cooling and hot water supply operation mode, the operation control part further controls, when opening degrees of all the indoor pressure reducing mechanisms reach a lower limit, the opening degree of the heat source pressure reducing mechanism so that the degree of subcooling of the water heat exchanger is a predetermined value.

8. The refrigeration cycle apparatus of claim 4, wherein the controller further includes a communication part that is capable of inputting, to the controller via communication, a capacity of the indoor unit having a cooling load and a capacity of the hot water supply unit having the hot water supply demand, and the operation control part determines, when selection of the control mode of the simultaneous cooling and hot water supply operation mode is switched from the cooling-prioritized mode to the hot-water-supply-prioritized mode, an initial opening degree of the heat source pressure reducing mechanism in accordance with the capacity of the indoor unit, the capacity of the hot water supply unit, and an opening degree of the indoor pressure reducing mechanism.

9. The refrigeration cycle apparatus of claim 1, wherein in the simultaneous cooling and hot water supply operation mode, the operation control part sets a temperature, by which the indoor unit is caused to enter a cooling-thermo-OFF state, lower than the cooling operation mode by 1 degree Celsius or more, and sets a temperature, by which the indoor unit is caused to enter a cooling-thermo-ON state, higher than the cooling operation mode by 1 degree Celsius or more.

10. The refrigeration cycle apparatus of claim 1, further comprising:

a hot water supply remote controller including a display part that displays a priority threshold switching relation amount related to switching between the cooling-prioritized mode and the hot-water-supply-prioritized mode as the control modes, and a hot-water-supply-prioritized operation switching relation amount related to the operation frequency of the compressor in the hot-water-supply-prioritized mode, and an input part through which the priority threshold switching relation amount and the hot-water-supply-prioritized operation switching relation amount are input.

11. The refrigeration cycle apparatus of claim 1, wherein the operation control part further includes a second simultaneous cooling and hot water supply operation mode, in which the cooling operation mode and a second hot water supply operation mode in which the refrigerant from the compressor is caused to flow to the water heat exchanger of the hot water supply unit not having a hot water supply demand, are performed simultaneously, and the second simultaneous cooling and hot water supply operation mode has the cooling-prioritized mode as a control mode, and the operation control part further executes, when there is the cooling load but no hot water supply demand, the second simultaneous cooling and hot water supply operation mode in which the control mode is the cooling-prioritized mode, and executes, when there is the cooling load and the hot water supply demand, the simultaneous cooling and hot water supply operation mode in which hot water supply is prioritized.

12. The refrigeration cycle apparatus of claim 11, further comprising:

high pressure detection means for detecting high pressure in the cooling operation mode and the second simultaneous cooling and hot water supply operation mode; cooling high pressure estimation means for estimating the high pressure in the cooling operation mode; and second cooling and hot water supply high pressure estimation means for estimating the high pressure in the second simultaneous cooling and hot water supply operation mode, wherein the controller further includes an additional exhaust heat recovery determination part that determines whether or not to execute the second simultaneous cooling and hot water supply operation mode when there is the cooling load but no hot water supply demand, and the additional exhaust heat recovery determination part performs switching from the cooling operation mode to the second simultaneous cooling and hot water supply operation mode when a ratio of the estimated high pressure in the simultaneous cooling and hot water supply operation mode to the high pressure in the cooling operation mode is smaller than or equal to a high pressure determination threshold in the cooling operation mode, and performs switching from the second simultaneous cooling and hot water supply operation mode to the cooling operation mode when the ratio of the estimated high pressure in the second simultaneous cooling and hot water supply operation mode to the estimated high pressure in the cooling operation mode is equal to or greater than the high pressure determination threshold in the second simultaneous cooling and hot water supply operation mode.

13. The refrigeration cycle apparatus of claim 1, wherein the indoor unit comprises a plurality of indoor units that are connected, by a pipe, in parallel with the heat source unit.

14. The refrigeration cycle apparatus of claim 13, wherein the plurality of indoor units are connected to the heat source unit via a branch unit.

* * * * *